(12) United States Patent
Saito

(10) Patent No.: US 6,347,022 B1
(45) Date of Patent: *Feb. 12, 2002

(54) SPIN-VALVE TYPE MAGNETORESISTIVE THIN FILM ELEMENT AND SPIN-VALVE TYPE MAGNETORESISTIVE THIN FILM HEAD USING THE SAME

(75) Inventor: Masamichi Saito, Niigata-ken (JP)

(73) Assignee: Alps Electric Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/359,958

(22) Filed: Jul. 22, 1999

(30) Foreign Application Priority Data

Jul. 24, 1998 (JP) .............................. 10-209191

(51) Int. Cl.⁷ ......................... G11B 5/147; G11B 5/127
(52) U.S. Cl. ..................................... 360/126; 360/314
(58) Field of Search ............................ 360/126, 125, 360/313, 314; 324/252

(56) References Cited

U.S. PATENT DOCUMENTS

| 5,206,590 A | 4/1993 | Dieny et al. |
| 5,287,238 A | 2/1994 | Baumgart et al. |
| 5,508,867 A | 4/1996 | Cain et al. |
| 5,549,978 A | 8/1996 | Iwasaki et al. |
| 5,635,835 A | 6/1997 | Mouchot et al. |
| 5,677,625 A | 10/1997 | Dieny |
| 5,696,656 A | 12/1997 | Gill et al. |
| 5,768,069 A | 6/1998 | Mauri |
| 5,869,963 A | * 2/1999 | Saito et al. .................. 324/252 |
| 5,880,913 A | 3/1999 | Gill |

FOREIGN PATENT DOCUMENTS

| JP | 9-92907 | 4/1997 |
| JP | 11-103102 | 4/1999 |

* cited by examiner

Primary Examiner—Allen T. Cao
(74) Attorney, Agent, or Firm—Brinks Hofer Gilson & Lione

(57) ABSTRACT

A spin-valve type magnetoresistive thin film head is provided with a spin-valve type magnetoresistive thin film element which includes a free magnetic layer; an upper nonmagnetic electrically-conductive layer and a lower nonmagnetic electrically-conductive layer sandwiching the free magnetic layer; an upper pinned magnetic layer and a lower pinned magnetic layer formed on the upper and lower nonmagnetic electrically-conductive layers, respectively, the magnetization directions of the upper and lower pinned magnetic layers being fixed; and an upper antiferromagnetic layer and a lower antiferromagnetic layer formed on the upper and lower pinned magnetic layers, respectively; in which a sensing electric current is applied in the direction perpendicular to the fixed magnetization of the pinned magnetic layers, and electrical resistance changes in response to the relationship between the fixed magnetization of the pinned magnetic layers and the variable magnetization of the free magnetic layer.

41 Claims, 11 Drawing Sheets

○ PLACED BELOW FREE MAGNETIC LAYER IN SINGLE SPIN-VALVE TYPE MAGNETO-RESISTIVE THIN FILM ELEMENT

● PLACED ABOVE FREE MAGNETIC LAYER IN SINGLE SPIN-VALVE TYPE MAGNETO-RESISTIVE THIN FILM ELEMENT

□ COMPARATIVE EXAMPLE : GL(LOWER) = 1050Å, GL(UPPER) = 1050Å
● EXAMPLE : GL(LOWER) = 1400Å, GL(UPPER) = 700Å
○ EXAMPLE : GL(LOWER) = 700Å, GL(UPPER) = 1400Å

□ COMPARATIVE EXAMPLE 1 : GL(LOWER) = 1050Å, GL(UPPER) = 1050Å
● EXAMPLE 1 : GL(LOWER) = 1050Å, GL(UPPER) = 1050Å

FIG. 10
PRIOR ART
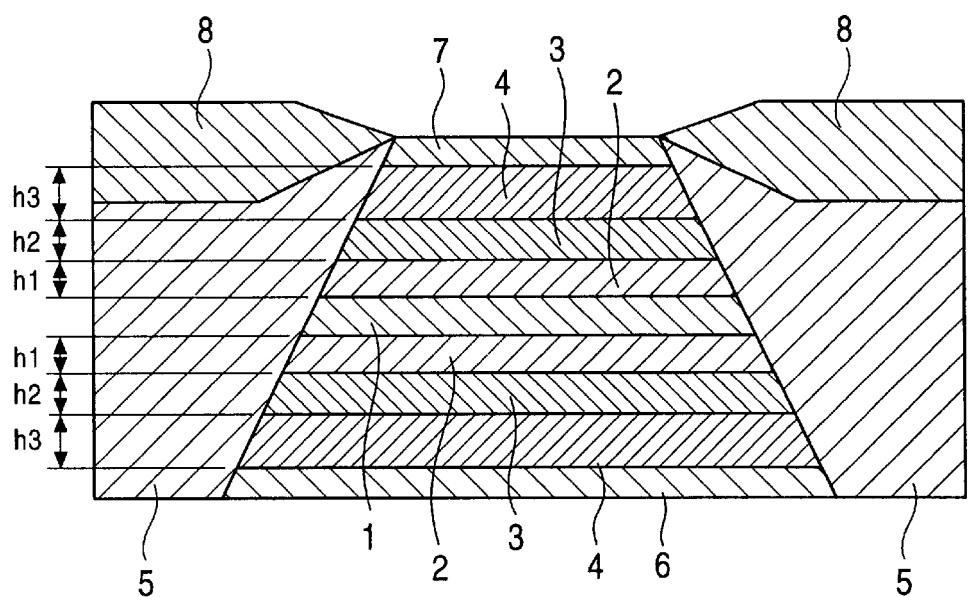
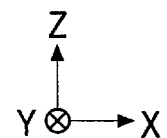

SPIN-VALVE TYPE MAGNETORESISTIVE THIN FILM ELEMENT AND SPIN-VALVE TYPE MAGNETORESISTIVE THIN FILM HEAD USING THE SAME

BACKGROUND OF THE INVENTION

1. Field of the Invention

The present invention relates to a dual spin-valve type magnetoresistive thin film element in which electrical resistance changes in response to the relationship between the magnetization direction of pinned magnetic layers and the magnetization direction of a free magnetic layer that is influenced by an external magnetic field. More particularly, the invention relates to a spin-valve type magnetoresistive thin film element in which satisfactory asymmetry can be obtained while maintaining a high rate of resistance variation, and to a spin-valve type magnetoresistive thin film head using the same.

2. Description of the Related Art

A spin-valve type magnetoresistive thin film element is a kind of giant magnetoresistive (GMR) element which uses a giant magnetoresistance effect, in which a high rate of resistance variation can be obtained in a relatively simple structure. Among spin-valve type magnetoresistive thin film elements, a single spin-valve type magnetoresistive thin film element has the simplest film structure, which includes 4 layers consisting of an antiferromagnetic layer, a pinned magnetic layer, a nonmagnetic electrically-conductive layer, and a free magnetic layer. A dual spin-valve type magnetoresistive thin film element has a film structure in which a higher rate of resistance variation can be obtained in comparison with the single spin-valve type magnetoresistive thin film element.

FIG. 10 is a sectional view of a conventional dual spin-valve type magnetoresistive thin film element, taken from the surface facing a recording medium.

As shown in FIG. 10, on either surface of a free magnetic layer 1, a nonmagnetic electrically-conductive layer 2, a pinned magnetic layer 3, and an antiferromagnetic layer 4 are deposited in that order symmetrically, and on either side of the laminate, a hard magnetic bias layer 5 and a lead layer 8 are formed. Numeral 6 represents an under layer composed of a metal, such as Ta, and numeral 7 represents a protective layer composed of Ta or the like.

As shown in FIG. 10, the pinned magnetic layers 3 and 3 are formed in contact with the antiferromagnetic layers 4 and 4, and the magnetizations of the pinned magnetic layers 3 and 3 are fixed in the Y direction (depth direction) by exchange coupling magnetic fields generated at interfaces between the pinned magnetic layers 3 and 3 and the antiferromagnetic layers 4 and 4.

The hard magnetic bias layers 5 and 5 are magnetized in the X direction in the drawing (track width direction), and the magnetization of the free magnetic layer 1 is set in the X direction under the influence of biasing magnetic fields from the hard magnetic bias layers 5 and 5.

In the dual spin-valve type magnetoresistive thin film element, a sensing electric current is applied in the X direction from the lead layer 8 to the free magnetic layer 1, nonmagnetic electrically-conductive layers 2 and 2, and pinned magnetic layers 3 and 3. A magnetic recording medium such as a hard disk moves in the Z direction, and when a fringing magnetic field from the recording medium is applied in the Y direction, the magnetization of the free magnetic layer 1 changes from being in the X direction to being in the Y direction. There is a change in electrical resistance in response to the relationship between the change in the magnetization direction of the free magnetic layer 1 and the fixed magnetization direction of the pinned magnetic layers 3 and 3, and thus, the fringing magnetic field is detected.

In the conventional dual spin-valve type magnetoresistive thin film element, as shown in FIG. 10, the nonmagnetic electrically-conductive layers 2 and 2 which are formed on upper and lower surfaces of the free magnetic layer 1, respectively, have the same thickness h1, the pinned magnetic layers 3 and 3 are formed at the same thickness h2, and the antiferromagnetic layers 4 and 4 are also formed at the same thickness h3. That is, the conventional dual spin-valve type magnetoresistive thin film element has a structure in which laminates sandwiching the free magnetic layer 1 are perfectly symmetrical.

However, in the dual spin-valve type magnetoresistive thin film element having a vertically symmetrical structure, the magnetization direction of the free magnetic layer 1 is not stabilized, and it is very difficult to obtain satisfactory asymmetry (vertical asymmetry of the regenerated output waveform).

FIG. 11 is a longitudinal sectional view which schematically shows a spin-valve type magnetoresistive thin film head, including the dual spin-valve type magnetoresistive thin film element shown in FIG. 10, and a pair of shield layers. A sensing electric current 9 from the lead layer 8 flows perpendicularly with respect to the drawing toward the front.

As shown in FIG. 11, various magnetic fields are applied to the free magnetic layer 1. First, interlayer coupling magnetic fields Hbf1 and Hbf2 (interlayer exchange coupling+topological coupling) occur between the pinned magnetic layers 3 and 3, which are magnetized in the right direction in the drawing (direction perpendicular to a recording medium D; depth direction), and the nonmagnetic electrically-conductive layers 2 and 2, and the magnetic fields Hbf1 and Hbf2 influence the free magnetic layer 1 at the interfaces with the free magnetic layer 1.

Static magnetic coupling fields (demagnetizing fields) Hd1 and Hd2 are also applied into the free magnetic layer 1 from the pinned magnetic layers 3 and 3.

The sensing electric current 9 mainly flows through the nonmagnetic electrically-conductive layers 2 and 2 having low resistivity, and induction magnetic fields Is1 and Is2 by the sensing electric current 9 influence the free magnetic layer 1.

Additionally, as shown in FIG. 11, a lower shield layer 10 is formed on the lower side of the spin-valve type magnetoresistive thin film element at a distance GL1 from the center of the free magnetic layer 1 of the spin-valve type magnetoresistive thin film element. An upper shield layer 11 is formed on the upper side of the spin-valve type magnetoresistive thin film element at a distance GL2 from the center of the free magnetic layer 1. Under the influence of the induction magnetic fields by the sensing electric current 9, shield bias magnetic fields occur from the lower shield layer 10 and the upper shield layer 11. A shield bias magnetic field S1 from the lower shield layer 10 and a shield bias magnetic field S2 from the upper shield layer 11 influence the free magnetic layer 1.

Herein, when magnetic fields applied to the free magnetic layer 1 in the right direction in the drawing, that is, interlayer coupling magnetic fields Hbf1 and Hbf2, the induction magnetic field Is2, and the shield bias magnetic field S2, are assumed to have positive values and when magnetic fields applied to the free magnetic layer 1 in the left direction in the drawing, that is, static magnetic coupling fields Hd1 and Hd2, the induction magnetic field Is1, and the shield bias magnetic field S1, are assumed to have negative values, if the sum of all the magnetic field values applied to the free magnetic layer 1 is zero, magnetic fields affecting the free magnetic layer 1 are totally offset, enabling satisfactory vertical asymmetry of the regenerated output waveform, which is so-called "asymmetry".

In the conventional spin-valve type magnetoresistive thin film element, as described above, since laminates disposed on the upper and lower surfaces of the free magnetic layer 1 are perfectly symmetrical, the induction magnetic field Is1 flowing from the lower laminate into the free magnetic layer 1, and the induction magnetic field Is2 flowing from the upper laminates into the free magnetic layer 1, have the same intensity, and as shown in FIG. 11, since induction magnetic fields Is1 and Is2 flow into the free magnetic layer 1 in opposite directions, the magnetic fields Is1 and Is2 are offset with respect to each other.

Next, since the distance GL1 from the center of the free magnetic layer 1 to the lower shield layer 10 and the distance GL2 from the center of the free magnetic layer 1 to the upper shield layer 11 are the same, the shield bias magnetic field S1 from the lower shield layer 10 applied to the free magnetic layer 1 has the same intensity as that of the shield bias magnetic field S2 from the upper shield layer 11 applied to the free magnetic layer 1. Since shield bias magnetic fields S1 and S2 flow in directions opposite to each other, the magnetic fields S1 and S2 are also offset with respect to each other.

That is, in order to adjust the vector sum of all magnetic fields entering into the free magnetic layer 1 to zero, in the spin-valve type magnetoresistive thin film element shown in FIG. 11, the vector sum of magnetic fields excluding the induction magnetic fields Is1 and Is2 and the shield bias magnetic fields S1 and S2, that is, Hbf1+Hbf2+Hd1+Hd2, must be adjusted to zero.

However, it is very difficult to adjust the vector sum of Hbf1+Hbf2+Hd1+Hd2 to zero under the conditions that upper and lower nonmagnetic electrically-conductive layers 2 and 2 have the same thickness h1, and upper and lower pinned magnetic layers 3 and 3 have the same thickness h2 as shown in FIG. 10.

Even if the vector sum of Hbf1+Hbf2+Hd1+Hd2 can be adjusted to zero by selecting the thicknesses h1 and h2 while maintaining the same thickness h1 for the nonmagnetic electrically-conductive layers 2 and 2 and the same thickness h2 for the pinned magnetic layers 3 and 3, although satisfactory asymmetry may be obtained, the rate of resistance variation is decreased instead, and thus characteristics of dual spin-valve type magnetoresistive thin film elements, in which a higher rate of resistance variation can be obtained in comparison with single spin-valve type magnetoresistive thin film elements, cannot be displayed.

SUMMARY OF THE INVENTION

The present invention overcomes the difficulties noted above with respect to the related art. It is an object of the present invention to provide a spin-valve type magnetoresistive thin film element in which satisfactory asymmetry can be obtained while maintaining a higher rate of resistance variation than that in a single spin-valve type magnetoresistive thin film element, and to provide a spin-valve type magnetoresistive thin film head using the same.

A spin-valve type magnetoresistive thin film head in accordance with the present invention is provided with a spin-valve type magnetoresistive thin film element which includes a free magnetic layer; an upper nonmagnetic electrically-conductive layer and a lower nonmagnetic electrically-conductive layer sandwiching the free magnetic layer; an upper pinned magnetic layer and a lower pinned magnetic layer formed on the upper and lower nonmagnetic electrically-conductive layers, respectively, the magnetization directions of the upper and lower pinned magnetic layers being fixed; and an upper antiferromagnetic layer and a lower antiferromagnetic layer formed on the upper and lower pinned magnetic layers, respectively; in which a sensing electric current is applied in the direction perpendicular to the fixed magnetization of the pinned magnetic layers, and electrical resistance changes in response to the relationship between the fixed magnetization of the pinned magnetic layers and the variable magnetization of the free magnetic layer. The vector sum of Hbf1+Hbf2+Hd1+Hd2+Is1+Is2+S1+S2 is zero, where the intensity of the magnetic field caused by interlayer coupling between the lower pinned magnetic layer and the lower nonmagnetic electrically-conductive layer is represented by Hbf1 (vector), the intensity of the magnetic field caused by interlayer coupling between the upper pinned magnetic layer and the upper nonmagnetic electrically-conductive layer is represented by Hbf2 (vector), the intensity of the static magnetic coupling field applied from the lower pinned magnetic layer to the free magnetic layer is represented by Hd1 (vector), the intensity of the static magnetic coupling field applied from the upper pinned magnetic layer to the free magnetic layer is represented by Hd2 (vector), the intensity of the induction magnetic field by an electric current applied to the free magnetic layer from the lower side is represented by Is1 (vector), the intensity of the induction magnetic field by an electric current applied to the free magnetic layer from the upper side is represented by Is2 (vector), the intensity of the shield bias magnetic field applied to the free magnetic layer from a lower shield layer formed on the lower side of the spin-valve type magnetoresistive thin film element with a gap layer therebetween is represented by S1 (vector), and the intensity of the shield bias magnetic field applied to the free magnetic layer from an upper shield layer formed on the upper side of the spin-valve type magnetoresistive thin film element with a gap layer therebetween is represented by S2 (vector).

In the present invention, the vector sum of Hbf1+Hbf2+Hd1+Hd2+Is1+Is2+S1+S2 may be adjusted to zero by creating a difference in thickness between the upper and lower nonmagnetic electrically-conductive layers and by changing the amount of the sensing electric current and the direction of the sensing electric current.

In such a case, preferably, the lower nonmagnetic electrically-conductive layer has a thickness of 16 to 38 angstroms and the upper nonmagnetic electrically-conductive layer has a thickness of 19 to 38 angstroms.

In the present invention, the vector sum of Hbf1+Hbf2+Hd1+Hd2+Is1+Is2+S1+S2 may be adjusted to zero by creating a difference in thickness between the upper and lower pinned magnetic layers and by changing the amount of the sensing electric current and the direction of the sensing electric current.

In such a case, preferably, the upper and lower pinned magnetic layers have a thickness of 15 to 80 angstroms.

In the present invention, the vector sum of Hbf1+Hbf2+Hd1+Hd2+Is1+Is2+S1+S2 may be adjusted to zero by creating a difference in thickness between the upper and lower antiferromagnetic layers and by changing the amount of the sensing electric current and the direction of the sensing electric current.

In the present invention, the spin-valve type magnetoresistive thin film element may include a metallic under layer on the lower antiferromagnetic layer and a metallic protective layer on the upper antiferromagnetic layer, and the vector sum of Hbf1+Hbf2+Hd1+Hd2+Is1+Is2+S1+S2 may be adjusted to zero by creating a difference in thickness between the metallic under layer and the metallic protective layer and by changing the amount of the sensing electric current and the direction of the sensing electric current.

In the present invention, the vector sum of Hbf1+Hbf2+Hd1+Hd2+Is1+Is2+S1+S2 may be adjusted to zero by creating a difference in distance between from the center of the free magnetic layer to the lower shield layer, and from the center of the free magnetic layer to the upper shield layer, and by changing the amount of the sensing electric current and the direction of the sensing electric current.

In a conventional dual spin-valve type magnetoresistive thin film element, upper and lower laminates sandwiching a free magnetic layer are perfectly symmetrical (refer to FIG. 10). In such a structure, satisfactory asymmetry cannot be obtained, and even if satisfactory asymmetry could be obtained, the rate of resistance variation may be decreased significantly, and thus, it is not possible to improve asymmetry and the rate of resistance variation at the same time.

In the present invention, a dual spin-valve type magnetoresistive thin film element has a vertically asymmetrical structure, thus enabling satisfactory asymmetry while maintaining a high rate of resistance variation.

In the present invention, a dual spin-valve type magnetoresistive thin film element having the following film structure was fabricated, and by changing the thickness of nonmagnetic electrically-conductive layers, the relationship between the thickness of the nonmagnetic electrically-conductive layers and the rate of resistance variation was investigated. The film structure of the dual spin-valve type magnetoresistive thin film element was as follows:

Si/alumina/Ta (50)/Antiferromagnetic layer: PtMn (200)/Pinned magnetic layer (lower): Co (30)/Nonmagnetic electrically-conductive layer (lower): Cu (24)/Free magnetic layer: Co (10)+NiFe (60)+Co (10)/Nonmagnetic electrically-conductive layer (upper): Cu (24)/Pinned magnetic layer (upper): Co (30)/Antiferromagnetic layer: PtMn (200)/Ta (50)

The numeric value in parentheses represents film thickness in angstroms.

In the experiment, first, the rate of resistance variation under an external magnetic field at ±30 (Oe) was measured with the thickness of the upper nonmagnetic electrically-conductive layer being fixed at 24 angstroms while changing the thickness of the lower nonmagnetic electrically-conductive layer. The rate of resistance variation under an external magnetic field at ±30 (Oe) was also measured with the thickness of the lower nonmagnetic electrically-conductive layer being fixed at 24 angstroms while changing the thickness of the upper nonmagnetic electrically-conductive layer. The results thereof are shown in FIG. 3.

In FIG. 3, the mark ○ shows the value when the thickness of the lower nonmagnetic electrically-conductive layer is varied with the thickness of the upper nonmagnetic electrically-conductive layer being fixed at 24 angstroms. In such a case, when the thickness of the lower nonmagnetic electrically-conductive layer is set at approximately 18 to 19 angstroms, the rate of resistance variation can be maximized, and when the thickness of the lower nonmagnetic electrically-conductive layer is set at approximately 19 angstroms or more, the rate of resistance variation is gradually decreased.

In FIG. 3, the mark ● shows the value when the thickness of the upper nonmagnetic electrically-conductive layer is varied with the thickness of the lower nonmagnetic electrically-conductive layer being fixed at 24 angstroms. In such a case, when the thickness of the upper nonmagnetic electrically-conductive layer is set at approximately 22 angstroms, the rate of resistance variation can be maximized, and when the thickness of the upper nonmagnetic electrically-conductive layer is set at approximately 22 angstroms or more, the rate of resistance variation is gradually decreased.

In a so-called "single spin-valve type magnetoresistive thin film element", in which an antiferromagnetic layer, a pinned magnetic layer, a nonmagnetic electrically-conductive layer, and a free magnetic layer, which are each one layer, are formed, the rate of resistance variation is approximately 4%. Therefore, in the present invention, the range of the thickness of the nonmagnetic electrically-conductive layer in which a rate of resistance variation of 4% or more can be obtained is set as desired. From the graph shown in FIG. 3, it is clear that when the thickness of the lower nonmagnetic electrically-conductive layer is set in the range from 16 to 38 angstroms, and when the thickness of the upper nonmagnetic electrically-conductive layer is set in the range from 19 to 38 angstroms, a rate of resistance variation of 4% or more can be obtained.

Next, in the present invention, in the dual spin-valve type magnetoresistive thin film element having the film structure described above, by changing the thickness of pinned magnetic layers, the relationship between the thickness of the pinned magnetic layers and the rate of resistance variation was investigated.

In the experiment, first, the rate of resistance variation under an external magnetic field at ±30 (Oe) was measured with the thickness of the upper pinned magnetic layer being fixed at 30 angstroms while changing the thickness of the lower pinned magnetic layer. The rate of resistance variation under an external magnetic field at ±30 (Oe) was also measured with the thickness of the lower pinned magnetic layer being fixed at 30 angstroms while changing the thickness of the upper pinned magnetic layer. The results thereof are shown in FIG. 4.

In FIG. 4, the rate of resistance variation when the thickness of the lower pinned magnetic layer only is changed, and the rate of resistance variation when the thickness of the upper pinned magnetic layer only is changed, have substantially the same curve. From FIG. 4, it is clear that a rate of resistance variation of 4% or more can be obtained by setting the thickness of the lower pinned magnetic layer and the upper pinned magnetic layer at 15 to 80 angstroms.

Next, in the present invention, experiments were carried out with respect to the relationship between the thickness of a nonmagnetic electrically-conductive layer and the interlayer coupling magnetic field Hbf which acts on a free magnetic layer from a pinned magnetic layer through the nonmagnetic electrically-conductive layer.

First, in the present invention, a single spin-valve type magnetoresistive thin film element, in which a nonmagnetic electrically-conductive layer was formed below a free magnetic layer was fabricated, and the relationship between the thickness of the nonmagnetic electrically-conductive layer and the interlayer coupling magnetic field Hbf was measured. The film structure of the single spin-valve type magnetoresistive thin film element was as follows:

Si/Alumina/Ta (50)/Antiferromagnetic layer: PtMn (200)/ Pinned magnetic layer: Co (30)/Nonmagnetic electrically-conductive layer (lower): Cu (X)/Free magnetic layer: Co (20)+NiFe (60)/Ta (50)

The numeric value in parentheses represents film thickness in angstroms.

Next, a single spin-valve type magnetoresistive thin film element, in which a nonmagnetic electrically-conductive layer was formed above a free magnetic layer was fabricated, and the relationship between the thickness of the nonmagnetic electrically-conductive layer and the interlayer coupling magnetic field Hbf was measured. The film structure of the single spin-valve type magnetoresistive thin film element was as follows:

Si/Alumina/Ta (50)/Free magnetic layer : NiFe (60)+Co (20)/Nonmagnetic electrically-conductive layer (upper): Cu (X)/Pinned magnetic layer: Co (30)/Antiferromagnetic layer: PtMn (200)/Ta (50)

The numeric value in parentheses represents film thickness in angstroms.

The reason for using single spin-valve type magnetoresistive thin film elements instead of using a dual spin-valve type magnetoresistive thin film element in this experiment is that in a dual spin-valve type magnetoresistive thin film element, it is not possible to respectively measure the interlayer coupling magnetic field Hbf1 from the lower side of a free magnetic layer and the interlayer coupling magnetic field Hbf2 from the upper side of the free magnetic layer, and only the total thereof can be measured.

In FIG. 5, as shown by the mark ○, although the interlayer coupling magnetic field is decreased as the thickness of the nonmagnetic electrically-conductive layer (lower) is increased, when the thickness of the nonmagnetic electrically-conductive layer (lower) is approximately 22 angstroms or more, the interlayer coupling magnetic field Hbf is increased, and when the thickness of the nonmagnetic electrically-conductive layer (lower) is approximately 26 angstroms or more, the interlayer coupling magnetic field Hbf is decreased again.

In FIG. 5, as shown by the mark ●, as the thickness of the nonmagnetic electrically-conductive layer (upper) is increased, the interlayer coupling magnetic field Hbf is steeply decreased up to a thickness of approximately 20 angstroms, and when the thickness is 20 angstroms or more, the interlayer coupling magnetic field Hbf is slowly decreased.

As described above, in the present invention, the thickness of the nonmagnetic electrically-conductive layer (lower) below the free magnetic layer is preferably set at 16 to 38 angstroms. When the thickness is in this range, as shown in FIG. 5, the intensity of the interlayer coupling magnetic field Hbf (Hbf1) is approximately in the range of from 1 to 50 (Oe).

In the present invention, the thickness of the nonmagnetic electrically-conductive layer (upper) above the free magnetic layer is preferably set at 19 to 38 angstroms. When the thickness is in this range, as shown in FIG. 5, the intensity of the interlayer coupling magnetic field Hbf (Hbf2) is approximately in the range of from 4 to 40 (Oe).

Next, in the present invention, in a dual spin-valve type magnetoresistive thin film element having the following film structure, the relationship between the thickness of pinned magnetic layers and the static magnetic coupling field from the pinned magnetic layers was sought by simulation. The film structure used was as follows:

Si/alumina/Ta (50)/Antiferromagnetic layer: PtMn (200)/ Pinned magnetic layer (lower): Co (30)/Nonmagnetic electrically-conductive layer: Cu (24)/Free magnetic layer: Co (10)+NiFe (60)+Co (10)/Nonmagnetic electrically-conductive layer: Cu (24)/Pinned magnetic layer (upper): Co (30)/Antiferromagnetic layer: PtMn (200)/Ta (50)

The numeric value in parentheses represents film thickness in angstroms.

First, the static magnetic coupling field Hd (Hd1) from the lower pinned magnetic layer was sought by simulation with the thickness of the upper pinned magnetic layer being fixed at 30 angstroms while changing the thickness of the lower pinned magnetic layer. The static magnetic coupling field Hd (Hd2) from the upper pinned magnetic layer was also sought by simulation with the thickness of the lower pinned magnetic layer being fixed at 30 angstroms while changing the thickness of the upper pinned magnetic layer. The results thereof are shown in FIG. 6.

As shown in FIG. 6, when the thickness of the lower pinned magnetic layer is varied with the thickness of the upper pinned magnetic layer being fixed and when the thickness of the upper pinned magnetic layer is varied with the thickness of the lower pinned magnetic layer being fixed, in both cases, the relationship between the thickness and the static magnetic coupling field Hd is represented by the identical line, and in FIG. 6, two lines are superposed. As described above, since the upper and lower pinned magnetic layers preferably have a thickness of 15 to 80 angstroms, within this range, the static magnetic coupling fields from the upper and lower pinned magnetic layers are approximately 9 to 48 (Oe).

Based upon the experimental results described above, in the present invention, a dual spin-valve type magnetoresistive thin film element having a vertically symmetrical structure shown in FIG. 11 (comparative example) and a dual spin-valve type magnetoresistive thin film element having a vertically asymmetrical structure shown in FIG. 2 (example) were fabricated, and the intensity of the interlayer coupling magnetic field Hbf and the static magnetic coupling field Hd which influence a free magnetic layer of each dual spin-valve type magnetoresistive thin film element were obtained. In the present invention, an interlayer coupling magnetic field and a static magnetic coupling field from the lower side are defined as Hbf1 and Hd1, respectively, and an interlayer coupling magnetic field and a static magnetic coupling field from the upper side are defined as Hbf2 and Hd2, respectively.

The film structure of the vertically symmetrical dual spin-valve type magnetoresistive thin film element (comparative example) was set from the bottom as follows:

Si/alumina/Ta (50)/Antiferromagnetic layer: PtMn (200)/ Pinned magnetic layer (lower): Co (40)/Nonmagnetic electrically-conductive layer (lower): Cu (22)/Free magnetic layer: Co (10)+NiFe (60)+Co (10)/Nonmagnetic electrically-conductive layer (upper): Cu (22)/Pinned magnetic layer (upper): Co (40)/Antiferromagnetic layer: PtMn (200)/Ta (50)

The numeric value in parentheses represents film thickness in angstroms. It has been confirmed by experiment that a rate of resistance variation of approximately 14.5% can be obtained in the dual spin-valve type magnetoresistive thin film element having such a film structure.

With respect to the comparative example, interlayer coupling magnetic fields Hbf1 and Hbf2 and static magnetic coupling fields Hd1 and Hd2 were obtained from the graphs shown in FIGS. 5 and 6.

In the comparative example, since the upper and lower nonmagnetic electrically-conductive layers have a thickness of 22 angstroms, as shown in FIG. 5, the interlayer coupling magnetic field Hbf1 is 2 (Oe) and the interlayer coupling magnetic field Hbf2 is 16 (Oe). In the comparative example, since the upper and lower pinned magnetic layers have a thickness of 40 angstroms, as shown in FIG. 6, the static magnetic coupling fields Hd1 and Hd2 are both 24 (Oe).

As shown in FIG. 11, since the interlayer coupling magnetic fields Hbf1 and Hbf2 and the static magnetic coupling fields Hd1 and Hd2 are applied into the free magnetic layer 1 in opposite directions, for example, when the magnetic fields in the right direction in the drawing are assumed to have positive values and the magnetic fields in the left direction in the drawing are assumed to have negative values, the interlayer coupling magnetic field Hbf1 is +2 (Oe), the interlayer coupling magnetic field Hbf2 is +16 (Oe), the static magnetic coupling field Hd1 is −24 (Oe), and the static magnetic coupling field Hd2 is −24 (Oe).

Next, the film structure of the vertically asymmetrical dual spin-valve type magnetoresistive thin film element (example) was set from the bottom as follows:

Si/alumina/Ta (50)/Antiferromagnetic layer: PtMn (200)/ Pinned magnetic layer (lower): Co (40)/Nonmagnetic electrically-conductive layer (lower): Cu (18)/Free magnetic layer: Co (10)+NiFe (60)+Co (10)/Nonmagnetic electrically-conductive layer (upper): Cu (22)/Pinned magnetic layer (upper): Co (40)/Antiferromagnetic layer: PtMn (200)/Ta (50)

The numeric value in parentheses represents film thickness in angstroms. In the example, the thickness of the lower nonmagnetic electrically-conductive layer was set at 18 angstroms, the thickness of the upper nonmagnetic electrically-conductive layer was set at 22 angstroms, and laminates sandwiching the free magnetic layer was asymmetrical. It has been confirmed by experiment that a rate of resistance variation of approximately 16.5% can be obtained in the dual spin-valve type magnetoresistive thin film element having such a film structure.

With respect to the example, interlayer coupling magnetic fields Hbf1 and Hbf2 and static magnetic coupling fields Hd1 and Hd2 were obtained from the graphs shown in FIGS. 5 and 6.

In the example, since the lower nonmagnetic electrically-conductive layer has a thickness of 18 angstroms, as shown in FIG. 5, the interlayer coupling magnetic field Hbf1 is 20 (Oe), and since the upper nonmagnetic electrically-conductive layer has a thickness of 22 angstroms, the interlayer coupling magnetic field Hbf2 is 16 (Oe).

In the example, since the upper and lower pinned magnetic layers have a thickness of 40 angstroms, as shown in FIG. 6, the static magnetic coupling fields Hd1 and Hd2 are both 24 (Oe).

In this example, since the interlayer coupling magnetic fields Hbf1 and Hbf2 and the static magnetic coupling fields Hd1 and Hd2 are also applied into the free magnetic layer 1 in opposite directions (refer to FIG. 2), if the interlayer coupling magnetic fields Hbf1 and Hbf2 are assumed to have positive values, the static magnetic coupling fields Hd1 and Hd2 have negative values. Therefore, the interlayer coupling magnetic field Hbf1 is +20 (Oe), the interlayer coupling magnetic field Hbf2 is +16 (Oe), the static magnetic coupling field Hd1 is −24 (Oe), and the static magnetic coupling field Hd2 is −24 (Oe).

The values of interlayer coupling magnetic fields Hbf1 and Hbf2 and static magnetic coupling fields Hd1 and Hd2 in the comparative example (vertically symmetrical dual spin-valve type magnetoresistive thin film element) and the example (vertically asymmetrical dual spin-valve type magnetoresistive thin film element) are shown in Table 1.

TABLE 1

| Sample | Hbf1 | Hbf2 | Hd1 | Hd2 | Total |
| --- | --- | --- | --- | --- | --- |
| Comparative Example (vertically symmetrical) | +2 Oe | +16 Oe | −24 Oe | −24 Oe | −30 Oe |
| Example (vertically asymmetrical) | +20 Oe | +16 Oe | −24 Oe | −24 Oe | −12 Oe |

In the far-right column in Table 1, the total of interlayer coupling magnetic fields Hbf1 and Hbf2 and static magnetic coupling fields Hd1 and Hd2 is shown. In the comparative example, the total is −30 (Oe), and in the example, the total is −12 (Oe). That is, in the dual spin-valve type magnetoresistive thin film element of the comparative example, a magnetic field of −30 (Oe) influences the free magnetic layer, and in the dual spin-valve type magnetoresistive thin film element of the example, a magnetic field of −12 (Oe) influences the free magnetic layer. As is evident from the above, in the example, the influence of a magnetic field acting on the free magnetic layer is reduced in comparison with the comparative example.

In the vertically symmetrical dual spin-valve type magnetoresistive thin film element, as shown in FIG. 11, induction magnetic fields by the sensing electric current 9 influence the free magnetic layer 1 as Is1 from the lower side of the free magnetic layer 1 and influence the free magnetic layer 1 as Is2 from the upper side of the free magnetic layer 1. However, in the vertically symmetrical structure, since the induction magnetic fields Is1 and Is2 have the same intensity and are applied into the free magnetic layer 1 in opposite directions, the induction magnetic fields Is1 and Is2 are offset with respect to each other, and thus the free magnetic layer 1 is not influenced by the induction magnetic fields.

Therefore, in the vertically symmetrical dual spin-valve type magnetoresistive thin film element, in order to adjust asymmetry to 0%, there is a possibility for asymmetry to be set at 0% by a shield bias magnetic field, i.e., the shield bias magnetic field S1 (vector)+the shield bias magnetic field S2 (vector). That is, in FIG. 11, by making the distance GL1 from the center of the free magnetic layer 1 to the lower shield layer 10 different from the distance GL2 from the center of the free magnetic layer 1 to the upper shield layer 11, the shield bias magnetic fields S1 and S2 applied to the free magnetic layer 1 have different intensities.

An experiment was carried out with respect to the relationship between the sensing electric current and asymmetry by setting the distances GL1 and GL2 at different values in the vertically symmetrical dual spin-valve type magnetoresistive thin film element shown as the comparative example. The experimental results are shown in FIG. 7. With respect to the sensing electric current in the horizontal axis, when the sensing electric current 9 shown in FIG. 11 flows perpendicularly with respect to the drawing toward the front, the sensing electric current is assumed to have a positive value, and when the sensing electric current 9 flows perpendicularly with respect to the drawing toward the back, the sensing electric current is assumed to have a negative value.

First, when the distances GL1 and GL2 are set at 1,050 angstroms, as shown by the mark □ in FIG. 7, even if the sensing electric current is changed, asymmetry remains at a certain value, and it is not possible to improve an asymmetry of approximately −20%.

Next, when the distance GL1 is set at 1,400 angstroms and the distance GL2 is set at 700 angstroms, as shown by the mark ● in FIG. 7, asymmetry may be varied by applying the sensing electric current, and asymmetry can be adjusted to 0% when the sensing electric current is applied at approximately 6 mA.

Next, when the distance GL1 is set at 700 angstroms and the distance GL2 is set at 1,400 angstroms, as shown by the mark ○ in FIG. 7, asymmetry may be varied by applying the sensing electric current, and asymmetry can be adjusted to 0% when the sensing electric current is applied at approximately −6 mA.

As described above, in the vertically symmetrical dual spin-valve type magnetoresistive thin film element, by making the distance GL1 different from the distance GL2, and by changing the intensity and direction of the sensing electric current, the intensities and directions of the shield bias magnetic fields S1 and S2 can be changed, and thus asymmetry can be adjusted to 0%.

In contrast, in the vertically asymmetrical dual spin-valve type magnetoresistive thin film element, asymmetry can be adjusted to 0% either by setting the distances GL1 and GL2 at different values, or by setting the distances GL1 and GL2 at the same value.

When a spin-valve type magnetoresistive thin film element has a vertically asymmetrical structure, the intensity of a sensing electric current flowing through the layers above a free magnetic layer differs from that of a sensing current flowing through the layers below the free magnetic layer, and there is a difference in intensity between induction magnetic fields Is1 and Is2 by the sensing electric current. Thus, the induction magnetic fields Is1 and Is2 are not offset with respect to each other, and an induction magnetic field determined by the vector sum of the induction magnetic field Is1 and the induction magnetic field Is2 can be used for adjusting asymmetry to 0%. In the dual spin-valve type magnetoresistive thin film element of the example, since the upper nonmagnetic electrically-conductive layer has a larger thickness than that of the lower nonmagnetic electrically-conductive layer, a larger amount of the sensing electric current flows through the layers above the free magnetic layer in comparison with the layers below the free magnetic layer.

An experiment was carried out with respect to the relationship between the sensing electric current and asymmetry by setting the distance GL1 from the center of the free magnetic layer 20 to the shield layer 30, and the distance GL2 from the center of the free magnetic layer 20 to the shield layer 31, at different values in the vertically asymmetrical dual spin-valve type magnetoresistive thin film element (example) shown in FIG. 2. The experimental results are shown in FIG. 8. With respect to the sensing electric current in the horizontal axis shown in FIG. 8, when the sensing electric current shown in FIG. 2 flows perpendicularly with respect to the drawing toward the front, the sensing electric current is assumed to have a positive value, and when the sensing electric current flows perpendicularly with respect to the drawing toward the back, the sensing electric current is assumed to have a negative value.

In FIG. 8, the experimental results for the vertically symmetrical dual spin-valve type magnetoresistive thin film element (comparative example) are also shown, in which the distances GL1 and GL2 are both set at 1,050 angstroms.

As shown in FIG. 8, in the vertically asymmetrical dual spin-valve type magnetoresistive thin film element (example), when the distance GL1 is set at 1,400 angstroms and the distance GL2 is set at 700 angstroms, asymmetry can be adjusted to 0% when the sensing electric current is applied at approximately 4 mA.

When the distance GL1 is set at 700 angstroms and the distance GL2 is set at 1,400 angstroms, asymmetry can be adjusted to 0% when the sensing electric current is applied at approximately at −4 mA.

As described above, both in the vertically symmetrical dual spin-valve type magnetoresistive thin film element and in the vertically asymmetrical duel spin-valve type magnetoresistive thin film element, asymmetry can be adjusted to 0% by making the distance between the center of the free magnetic layer and the upper shield layer different from the distance between the center of the free magnetic layer and the lower shield layer. However, there is a difference in the amount of the sensing electric current required for adjusting asymmetry to 0% between the vertically symmetrical structure and the vertically asymmetrical structure.

As described above, in the vertically symmetrical dual spin-valve type magnetoresistive thin film element as the comparative example, as shown in FIG. 7, when GL1 is set at 1,400 angstroms and GL2 is set at 700 angstroms, a sensing electric current of 6 mA is required to adjust asymmetry to 0%.

On the other hand, in the vertically asymmetrical dual spin-valve type magnetoresistive thin film element as the example, as shown in FIG. 8, when GL1 is set at 1,400 angstroms and GL2 is set at 700 angstroms, a sensing current of 4 mA is required to adjust asymmetry to 0%.

Consequently, in the vertically symmetrical dual spin-valve type magnetoresistive thin film element (comparative example), a sensing electric current which is larger by 2 mA must be applied to adjust asymmetry to 0% in comparison with the vertically asymmetrical dual spin-valve type magnetoresistive thin film element (example). The difference of 2 mA in sensing electric current may vary with the thickness of the individual layers constituting dual spin-valve type magnetoresistive thin film elements. As shown in Table 1, in the comparative example, the total of interlayer coupling magnetic fields Hbf1 and Hbf2 and static magnetic coupling fields Hd1 and Hd2 is −30 (Oe), and in contrast, in the example, the total of interlayer coupling magnetic fields Hbf1 and Hbf2 and static magnetic coupling fields Hd1 and Hd2 is −12 (Oe). In the example, the absolute value of the magnetic field to be compensated for by the shield bias magnetic field is originally smaller, and in the example, since the induction magnetic field by the sensing electric current (vector sum of the induction magnetic field Is1 and the induction magnetic field Is2) is also taken into account, asymmetry can be adjusted to 0% by the shield bias magnetic field (vector sum of the shield bias magnetic field S1 and the shield bias magnetic field S2) and by the induction magnetic field by the sensing electric current. Both the intensity of the shield bias magnetic field and the intensity of the induction magnetic field by the sensing electric current depend on the amount of the sensing electric current. By properly adjusting the distances GL1 and GL2 and the direction of the sensing electric current, the shield bias magnetic field and the induction magnetic field by the sensing electric current, which are applied to the free magnetic layer, can be set in the same direction. If the shield bias magnetic field and the induction magnetic field by the sensing electric current are set in the same direction, the required strength of the magnetic field can be compensated for both by the shield bias magnetic field and by the induction magnetic field by the sensing electric current, with a smaller amount of sensing electric current, in comparison with the amount of sensing electric current required in the vertically symmetrical dual spin-valve type magnetoresistive thin film element (comparative example) in which asymmetry can be adjusted to 0% by the shield bias magnetic field alone.

Of course, the present invention covers both a vertically symmetrical dual spin-valve type magnetoresistive thin film element in which the distances GL1 and GL2 are different and a vertically asymmetrical dual spin-valve type magnetoresistive thin film element in which the distances GL1 and GL2 are different.

Next, in order to adjust asymmetry to 0% only by induction magnetic fields without using shield bias magnetic fields, an experiment was carried out with respect to the relationship between the sensing electric current and asymmetry, by setting the distances GL1 and GL2 at 1,050 angstroms. The experimental results are shown in FIG. 9. With respect to the sensing electric current in the horizontal axis shown in FIG. 9, when the sensing electric current shown in FIG. 2 flows perpendicularly with respect to the drawing toward the front, the sensing electric current is assumed to have a positive value, and when the sensing electric current flows perpendicularly with respect to the drawing toward the back, the sensing electric current is assumed to have a negative value.

In FIG. 9, the experimental results for the vertically symmetrical dual spin-valve type magnetoresistive thin film element (comparative example) are also shown, in which the distances GL1 and GL2 are both set at 1,050 angstroms. As shown in FIG. 9, in the comparative example, even if the sensing electric current is changed, asymmetry remains a certain value, which is approximately −20%.

In the vertically asymmetrical dual spin-valve type magnetoresistive thin film element, the relationship between the sensing electric current and asymmetry was measured with the distances GL1 and GL2 being set at 1,050 angstroms.

As shown in FIG. 9, as the sensing electric current is changed, asymmetry varies, and when the sensing electric current is applied at approximately 10 mA, asymmetry can be adjusted to 0%. In the vertically asymmetrical dual spin-valve type magnetoresistive thin film element having the film structure described above, since the thickness of the upper nonmagnetic electrically-conductive layer is greater than that of the lower nonmagnetic electrically-conductive layer by 4 angstroms, a larger amount of sensing electric current flows in the upper side than in the lower side of the free magnetic layer.

If the amount of sensing electric current is increased, the induction magnetic field Is2 generated in the upper side of the free magnetic layer 20 is increased in comparison with the induction magnetic field Is1 generated in the lower side of the free magnetic layer 20. It is easily understood also from FIG. 9 that the induction magnetic field determined by the vector sum of the induction magnetic field Is1 and the induction magnetic field Is2 is proportional to the sensing electric current intensity.

Therefore, in the vertically asymmetrical dual spin-valve type magnetoresistive thin film element, if the direction of the sensing electric current and the sensing electric current intensity are properly adjusted, even without using shield bias magnetic fields, asymmetry can be adjusted to 0% without fail.

As described above, in the present invention, by actively fabricating a dual spin-valve type magnetoresistive thin film element with a vertically asymmetrical structure, and by properly adjusting the direction of the sensing electric current and the intensity thereof, all the magnetic fields influencing the free magnetic layer can be cancelled, and thus asymmetry can be adjusted to 0%.

In the example described above, although the upper and lower nonmagnetic electrically-conductive layers are formed at different thickness to construct the vertically asymmetrical structure, any pair of identical layers sandwiching the free magnetic layer may be formed at different thickness to obtain the vertically asymmetrical structure.

In the present invention, in order to construct the vertically asymmetrical structure, the thickness of the upper pinned magnetic layer may be different from that of the lower pinned magnetic layer, the thickness of the upper antiferromagnetic layer may be different from that of the lower antiferromagnetic layer, or the thickness of a metallic under layer formed on the lower antiferromagnetic layer may be different from that of a metallic protective layer formed on the upper antiferromagnetic layer.

Instead of forming one pair of identical layers sandwiching the free magnetic layer at different thickness, two or more pairs of identical layers may be formed at different thickness to construct the vertically asymmetrical structure.

Additionally, even in a vertically symmetrical dual spin-valve type magnetoresistive thin film element, by setting the distance between the center of a free magnetic layer and an upper shield layer at a different value from that of the distance between the center of the free magnetic layer and a lower shield layer, a shield bias magnetic field can be used, and thus asymmetry can be adjusted to 0%.

Even in the vertically symmetrical dual spin-valve type magnetoresistive thin film element as shown in FIG. 11, in which the distance GL1 is the same as the distance GL2, by properly setting the thickness of the individual layers constituting the dual spin-valve type magnetoresistive thin film element, asymmetry can be adjusted to 0%. For example, the film structure may be set from the bottom as follows:

Si/alumina/Ta (50)/Antiferromagnetic layer: PtMn (200)/Pinned magnetic layer (lower): Co (20)/Nonmagnetic electrically-conductive layer (lower): Cu (20)/Free magnetic layer: Co (10)+NiFe (60)+Co (10)/Nonmagnetic electrically-conductive layer (upper): Cu (20)/Pinned magnetic layer (upper): Co (20)/Antiferromagnetic layer: PtMn (200)/Ta (50)

The numeric value in parentheses represents film thickness in angstroms. In the above film structure, with reference to FIGS. 5 and 6, it is known that the interlayer coupling magnetic field Hbf1 is 3 (Oe), the static magnetic coupling field Hd1 is −12 (Oe), the interlayer coupling magnetic field Hbf2 is 22 (Oe), and the static magnetic coupling field Hd2 is −12 (Oe), thus making the total approximately zero. However, in such a film structure, although satisfactory asymmetry is obtained, since the upper and lower pinned magnetic layers have a small thickness of 20 angstroms, the rate of resistance variation is decreased to 7.0% (refer to FIG. 3).

Satisfactory asymmetry may also be obtained in a film structure as follows:

Si/alumina/Ta (50)/Antiferromagnetic layer: PtMn (200)/Pinned magnetic layer (lower): Co (40)/Nonmagnetic electrically-conductive layer (lower): Cu (19)/Free magnetic layer: Co (10)+NiFe (60)+Co (10)/Nonmagnetic electrically-conductive layer (upper): Cu (19)/Pinned magnetic layer (upper): Co (40)/Antiferromagnetic layer: PtMn (200)/Ta (50)

The numeric value in parentheses represents a film thickness in angstroms. In the above film structure, with reference to FIGS. 5 and 6, it is known that the interlayer coupling magnetic field Hbf1 is 10 (Oe), the static magnetic coupling field Hd1 is −24 (Oe), the interlayer coupling magnetic field Hbf2 is 40 (Oe), and the static magnetic coupling field Hd2 is −24 (Oe), thus making the total approximately zero. However, in such a film structure, although satisfactory asymmetry is obtained, since the upper and lower nonmagnetic electrically-conductive layers have a small thickness of 19 angstroms, the rate of resistance variation obtained will be 10.1%, which is not very high for a dual spin-valve type magnetoresistive thin film element (refer to FIG. 4).

That is, an object of the present invention is to adjust asymmetry to 0% while maintaining a high rate of resistance variation, which is the major characteristic of dual spin-valve type magnetoresistive thin film elements. Therefore, first, a vertically asymmetrical structure is fabricated by selecting the thickness of the individual layers so as to obtain a high rate of resistance variation, and thus induction magnetic fields by a sensing electric current, that could not be used conventionally, can be actively used, enabling the adjustment of asymmetry to 0%.

BRIEF DESCRIPTION OF THE DRAWINGS

FIG. 10 is a sectional view of a conventional spin-valve type magnetoresistive thin film element (dual spin-valve type magnetoresistive thin film element), taken from the surface facing a recording medium.

DESCRIPTION OF THE PREFERRED EMBODIMENTS

Figure 1:
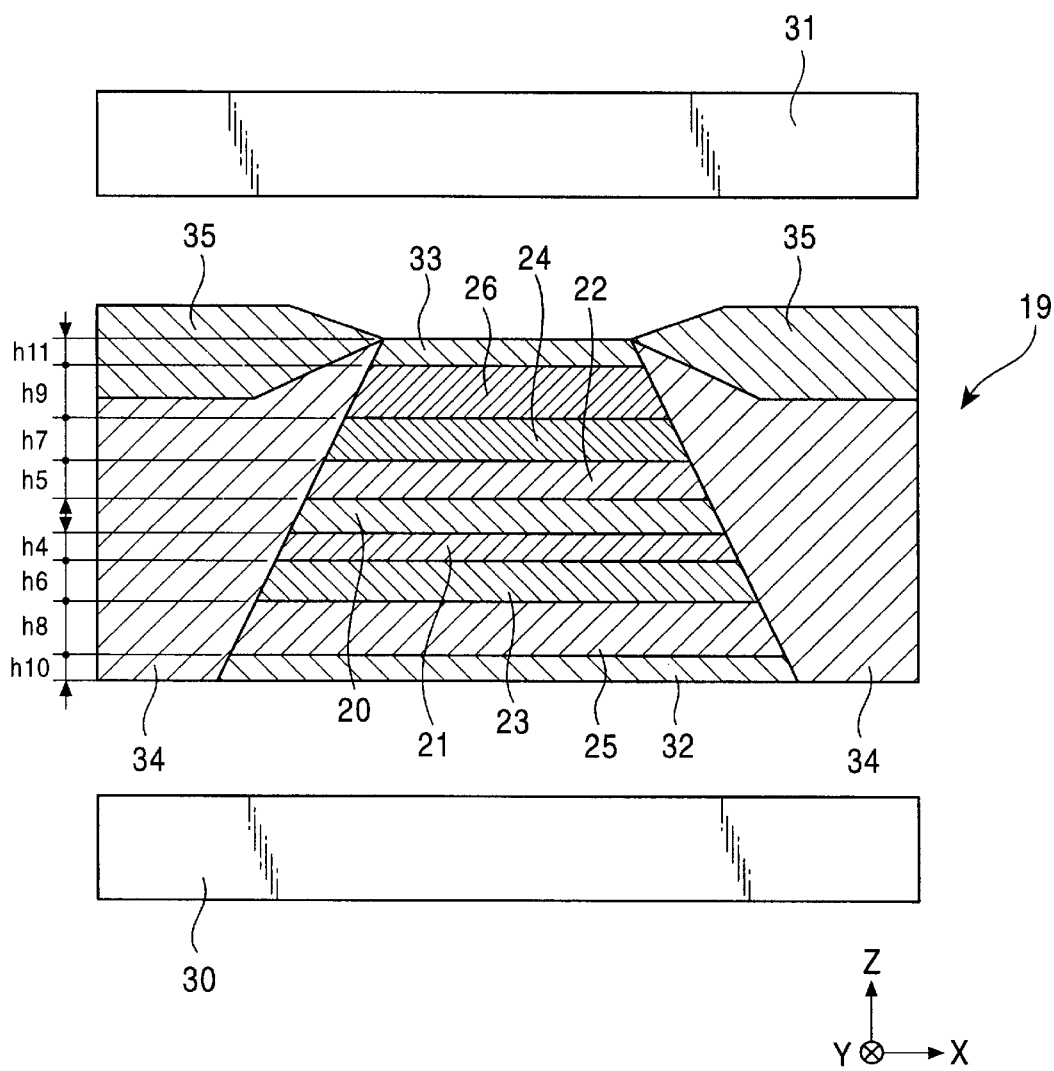
FIG. 1 is a sectional view of a spin-valve type magnetoresistive thin film head using a spin-valve type magnetoresistive thin film element (dual spin-valve type magnetoresistive thin film element) in accordance with the present invention, taken from the surface facing a recording medium.

FIG. 1 is a sectional view of a spin-valve type magnetoresistive thin film head provided with a spin-valve type magnetoresistive thin film element (dual spin-valve type magnetoresistive thin film element) in accordance with the present invention and a pair of shield layers, taken from the surface facing a recording medium. A lower shield layer 30 is formed on the lower side of a spin-valve type magnetoresistive thin film element 19 shown in FIG. 1 with a gap layer (not shown in the drawing) therebetween, and an upper shield layer 31 is formed on the upper side of the spin-valve type magnetoresistive thin film element 19 with a gap layer (not shown in the drawing) therebetween.

A metallic under layer 32 composed of a nonmagnetic electrically conductive material such as tantalum (Ta) is formed on the bottom of the spin-valve type magnetoresistive thin film element 19 shown in FIG. 1. A lower antiferromagnetic layer 25, a lower pinned magnetic layer 23, a lower nonmagnetic electrically-conductive layer 21, and a free magnetic layer 20 are deposited, in that order, on the metallic under layer 32. Furthermore, on the free magnetic layer 20, an upper nonmagnetic electrically-conductive layer 22, an upper pinned magnetic layer 24, an upper antiferromagnetic layer 26, and a metallic protective layer 33 composed of Ta or the like are deposited, in that order. The metallic under layer 32 is provided to align the crystal orientation of the lower antiferromagnetic layer 25 and to inhibit oxidation of the lower antiferromagnetic layer 25. The metallic protective layer 33 is provided to inhibit oxidation of the upper antiferromagnetic layer 26.

As shown in FIG. 1, on either side of the laminate including the metallic under layer 32 to the metallic protective layer 33, a hard magnetic bias layer 34 and a lead layer 35 are formed.

In the present invention, the antiferromagnetic layers 25 and 26 are composed of a platinum-manganese (PtMn) alloy film. The PtMn alloy film has a higher blocking temperature than that of an FeMn alloy film or NiMn alloy film which has conventionally been used as an antiferromagnetic material, and has excellent heat resistance. Instead of the PtMn alloy, an X—Mn alloy, where X is an element selected from the group consisting of Pd, Ru, Ir, Os, and Rh, or a Pt—Mn—X alloy, where X is an element selected from the group consisting of Ni, Pd, Rh, Ru, Ir, Cr, and Co, may be used as the antiferromagnetic layers 25 and 26.

In the present invention, the pinned magnetic layers 23 and 24 are composed of an NiFe alloy film, a CoFe alloy film, a CoFeNi alloy film, a Co film, or the like. Although the free magnetic layer 20 may be composed of the same material as that of the pinned magnetic layers 23 and 24, in order to improve the rate of resistance variation, the free magnetic layer 20 is preferably formed in a three-layered structure including a Co film, an NiFe film, and a Co film.

The nonmagnetic electrically conductive layers 21 and 22 are composed of a Cu film, the hard magnetic bias layers 34 and 34 are composed of a cobalt-platinum (CoPt) alloy film, a cobalt-chromium-platinum (CoCrPt) alloy film, or the like. The lead layers 35 and 35 are composed of chromium (Cr), copper (Cu), or the like. The lower shield layer 30 and the upper shield layer 31 are composed of an NiFe alloy film, and the gap layers (not shown in the drawing) are composed of an alumina film.

As shown in FIG. 1, the lower pinned magnetic layer 23 and the upper pinned magnetic layer 24 are in contact with the lower antiferromagnetic layer 25 and the upper antiferromagnetic layer 26, respectively, and by heat treatment in this state while applying a magnetic field in the Y direction in the drawing (depth direction; direction of the fringing magnetic field from a recording medium), exchange coupling magnetic fields are obtained at interfaces between both layers, and the magnetization of the lower and upper pinned magnetic layers 23 and 24 are fixed in the Y direction.

The hard magnetic bias layers 34 and 34 are magnetized in the X direction in the drawing (track width direction), and the magnetization of the free magnetic layer 20 is set in the X direction under the influence of biasing magnetic fields from the hard magnetic bias layers 34 and 34.

In the spin-valve type magnetoresistive thin film element shown in FIG. 1, when a sensing electric current is applied from the lead layers 35 and 35 to the pinned magnetic layers 23 and 24, nonmagnetic electrically-conductive layers 21 and 22, and the free magnetic layer 20, and a magnetic field is applied in the Y direction from a recording medium, the magnetization of the free magnetic layer 20 changes from being in the X direction to being in the Y direction. At this stage, electrons which are about to migrate from one layer to the other layer in the free magnetic layer 20 and the pinned magnetic layers 23 and 24 scatter at the interfaces between the nonmagnetic electrically-conductive layers 21 and 22 and the pinned magnetic layers 23 and 24, or at the interfaces between the nonmagnetic electrically-conductive layers 21 and 22 and the free magnetic layer 20, and electrical resistance changes. Thus, because of a change in steady-state current, a sensing current can be obtained.

In the present invention, as shown in FIG. 1, the lower nonmagnetic electrically-conductive layer 21 has a thickness h4, specifically, in the range of from 16 to 38 angstroms. The upper nonmagnetic electrically-conductive layer 22 has a thickness h5, specifically, in the range of from 19 to 38 angstroms. The lower pinned magnetic layer 23 has a thickness h6, specifically, in the range of from 15 to 80 angstroms. The upper pinned magnetic layer 24 has a thickness h7, specifically, in the range of from 15 to 80 angstroms.

The lower antiferromagnetic layer 25 has a thickness h8, and the upper antiferromagnetic layer 26 has a thickness h9.

The metallic under layer 32 has a thickness h10, and the metallic protective layer 33 has a thickness h11.

Figure 3:
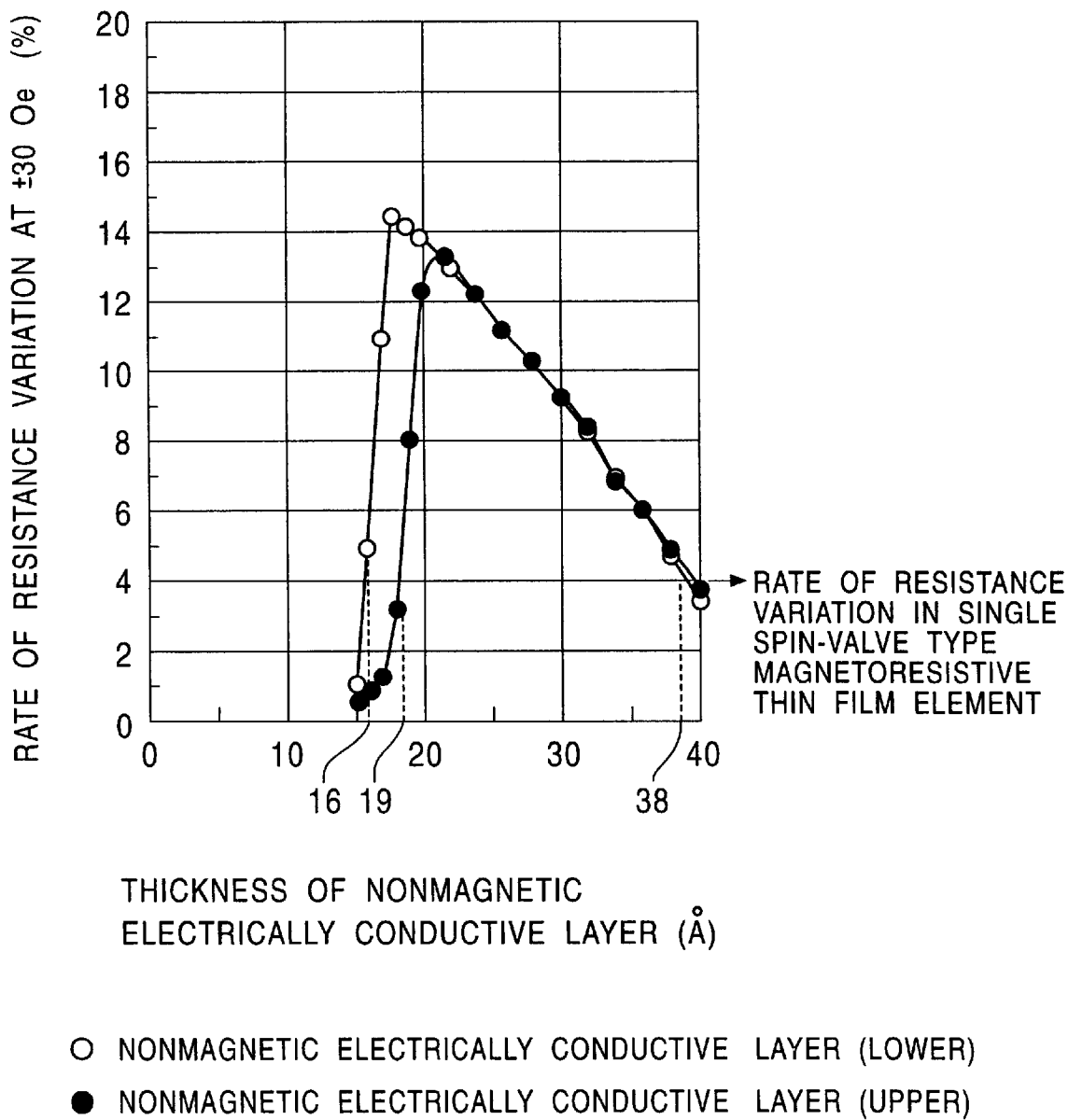
FIG. 3 is a graph which shows the relationship between the thickness of upper and lower nonmagnetic electrically-conductive layers constituting a dual spin-valve type magnetoresistive thin film element and the rate of resistance variation.
Figure 4:
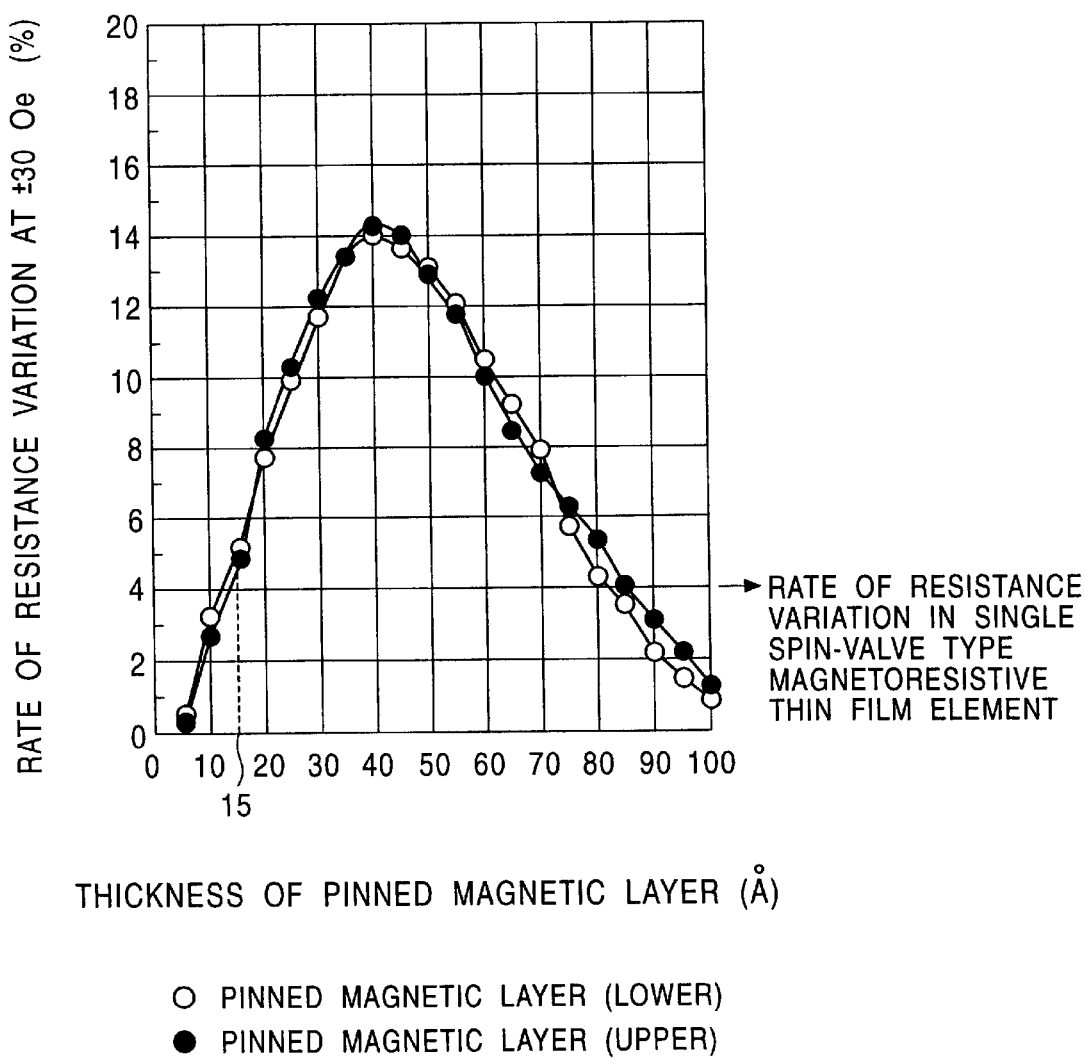
FIG. 4 is a graph which shows the relationship between the thickness of upper and lower pinned magnetic layers constituting a dual spin-valve type magnetoresistive thin film element and the rate of resistance variation.

It has been confirmed that a rate of resistance variation of 4% or more can be obtained when the nonmagnetic electrically-conductive layers 21 and 22 and the pinned magnetic layers 23 and 24 have the thickness in the ranges described above, and the antiferromagnetic layers 25 and 26 are formed at a thickness of approximately 200 angstroms (refer to FIGS. 3 and 4). The rate of resistance variation of 4% corresponds to an average rate of resistance variation in a so-called "single spin-valve type magnetoresistive thin film element", in which each one of antiferromagnetic layer, pinned magnetic layer, nonmagnetic electrically-conductive layer, and free magnetic layer are formed. In accordance with the present invention, a rate of resistance variation which is at least larger than that of a single spin-valve type magnetoresistive thin film element can be obtained.

In the spin-valve type magnetoresistive thin film element shown in FIG. 1, the lower and upper nonmagnetic electrically-conductive layers 21 and 22 are formed at different thickness, and laminates sandwiching the free magnetic layer 20 are formed asymmetrically.

In the present invention, the lower and upper pinned magnetic layers 23 and 24 may be formed at different thickness, and the lower and upper antiferromagnetic layers 25 and 26 may be formed at different thickness. The metallic under layer 32 and the metallic protective layer 33 also may be formed at different thickness.

That is, in the present invention, at least one pair of identical layers sandwiching the free magnetic layer 20 is formed at different thickness, resulting in a vertically asymmetrical structure.

Next, with reference to FIG. 2, various magnetic fields applied to the free magnetic layer 20 will be described.

Figure 2:
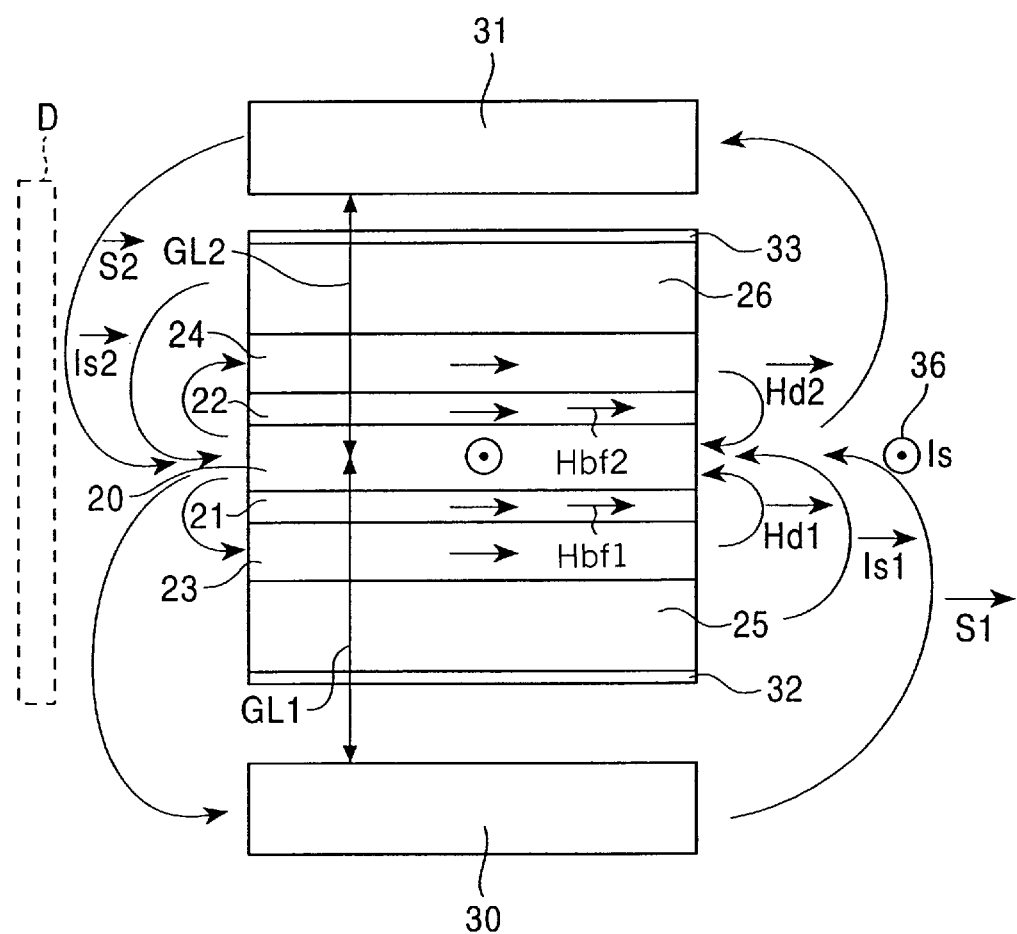
FIG. 2 is a longitudinal sectional view which schematically shows the spin-valve type magnetoresistive thin film head using the spin-valve type magnetoresistive thin film element shown in FIG. 1.
Figure 5:
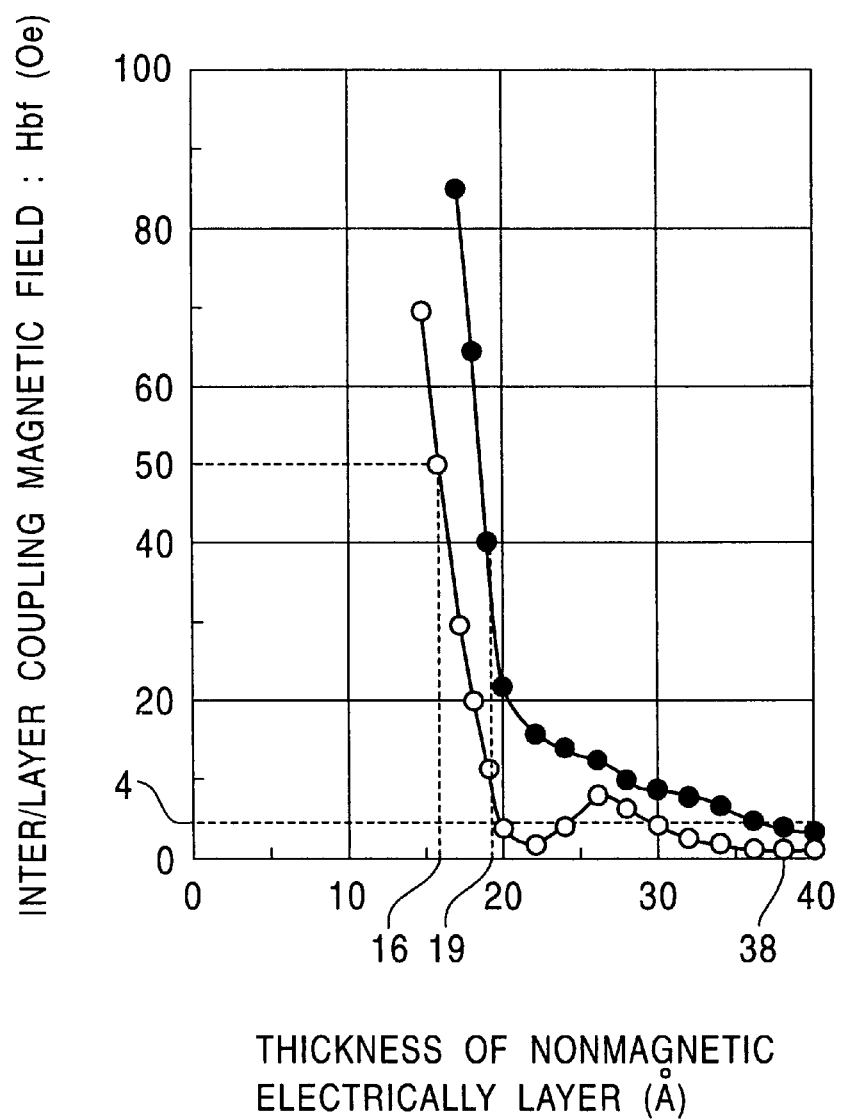
FIG. 5 is a graph which shows the relationship between the thickness of a nonmagnetic electrically-conductive layer placed below a free magnetic layer in a single spin-valve type magnetoresistive thin film element and the interlayer coupling magnetic field Hbf, and the relationship between the thickness of a nonmagnetic electrically-conductive layer placed above a free magnetic layer in a single spin-valve type magnetoresistive thin film element and the interlayer coupling magnetic field Hbf.

As shown in FIG. 2, interlayer coupling magnetic fields Hbf1 and Hbf2 are applied to the free magnetic layer 20 from the pinned magnetic layers 23 and 24 with the nonmagnetic electrically-conductive layers 21 and 22 therebetween. It has been confirmed by experiment that the intensity of the interlayer coupling magnetic fields Hbf1 and Hbf2 varies as the thickness of the nonmagnetic electrically-conductive layers 21 and 22 is changed (refer to FIG. 5). If the nonmagnetic electrically-conductive layers 23 and 24 have the same thickness, it is clear from FIG. 5 that the interlayer coupling magnetic field Hbf1 affecting below the free magnetic layer 20 is smaller than the interlayer coupling magnetic field Hbf2 affecting above the free magnetic layer 20.

As shown in FIG. 2, the magnetization of the pinned magnetic layers 23 and 24 is fixed in the direction departing from a recording medium D (right direction in the drawing; depth direction), and static magnetic coupling fields (demagnetizing fields) Hd1 and Hd2 directly act on the free magnetic layer 20 from the pinned magnetic layers 23 and 24.

Figure 6:
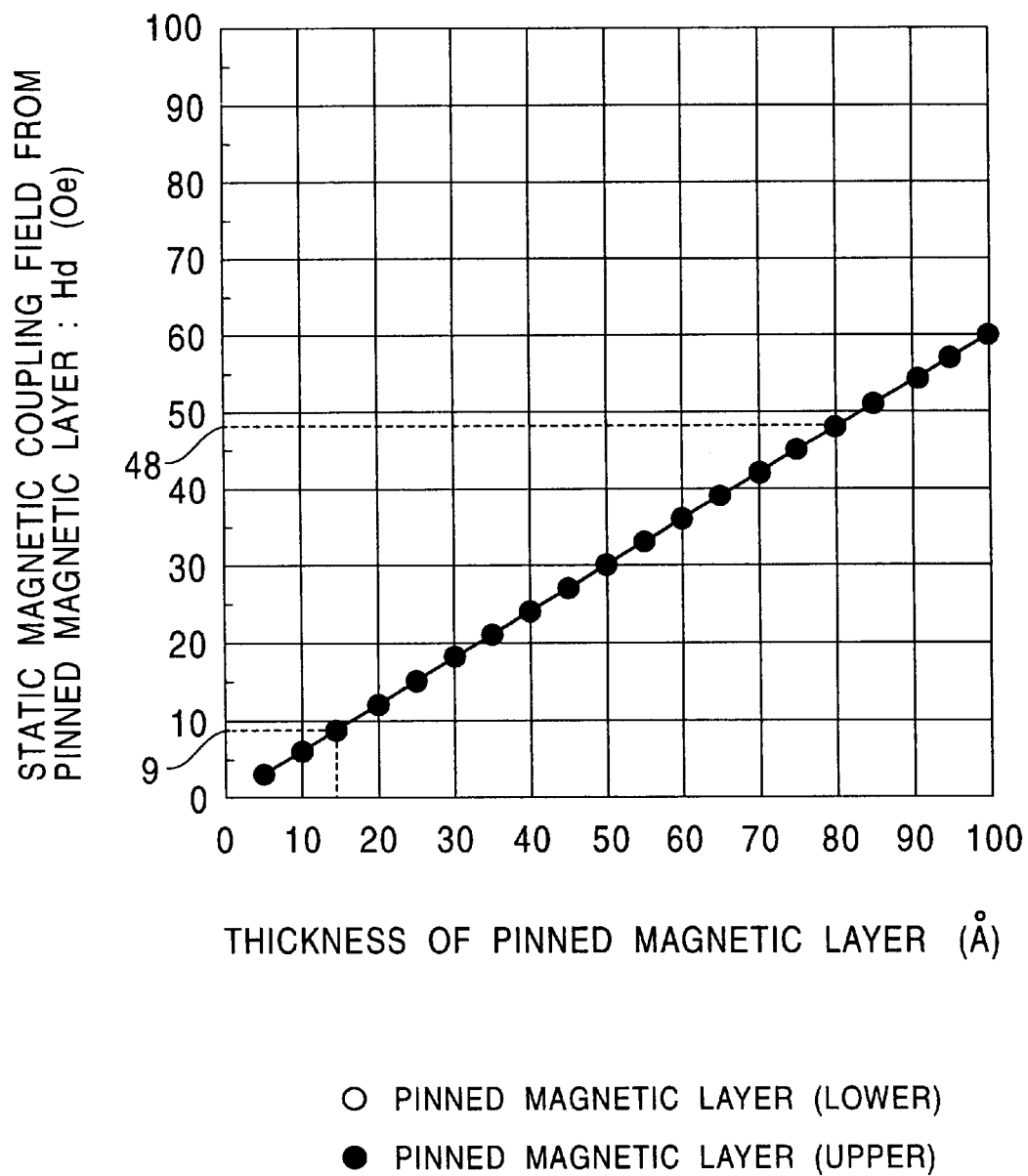
FIG. 6 is a graph which shows the relationship between the thickness of upper and lower pinned magnetic layers constituting a dual spin-valve type magnetoresistive thin film element and the static magnetic coupling field from each pinned magnetic layer.
Figure 7:
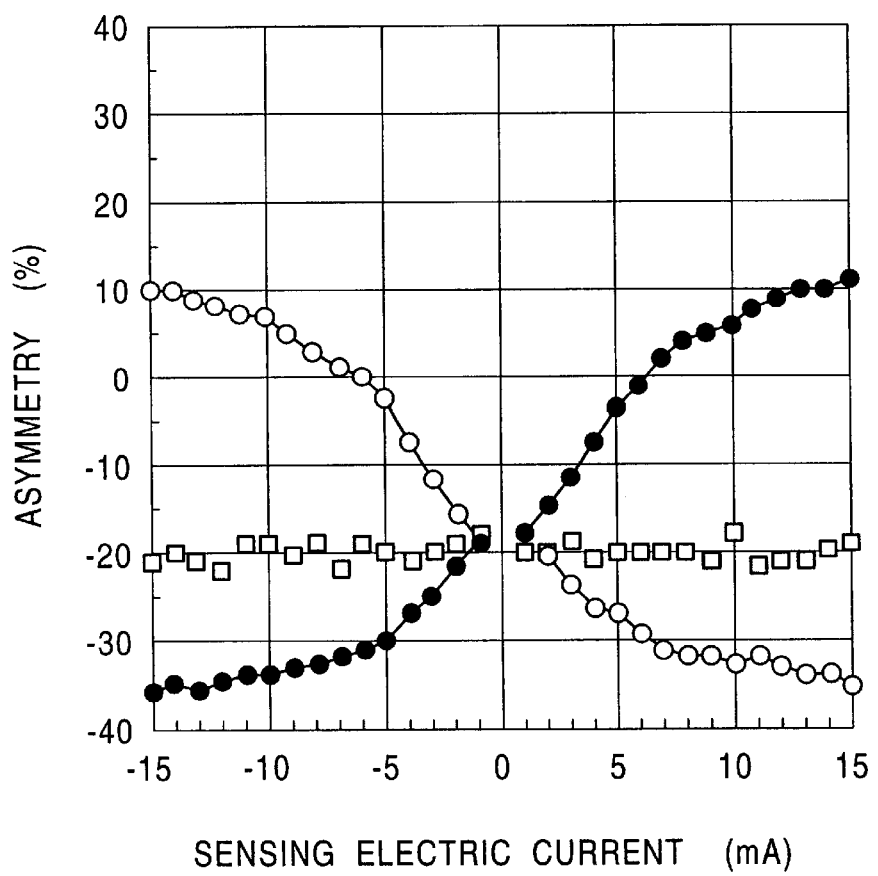
FIG. 7 is a graph which shows the relationship between the sensing electric current and asymmetry with respect to a vertically symmetrical dual spin-valve type magnetoresistive thin film element (comparative example), in which the distances GL1 and GL2 are set at different values or at the same value.
Figure 8:
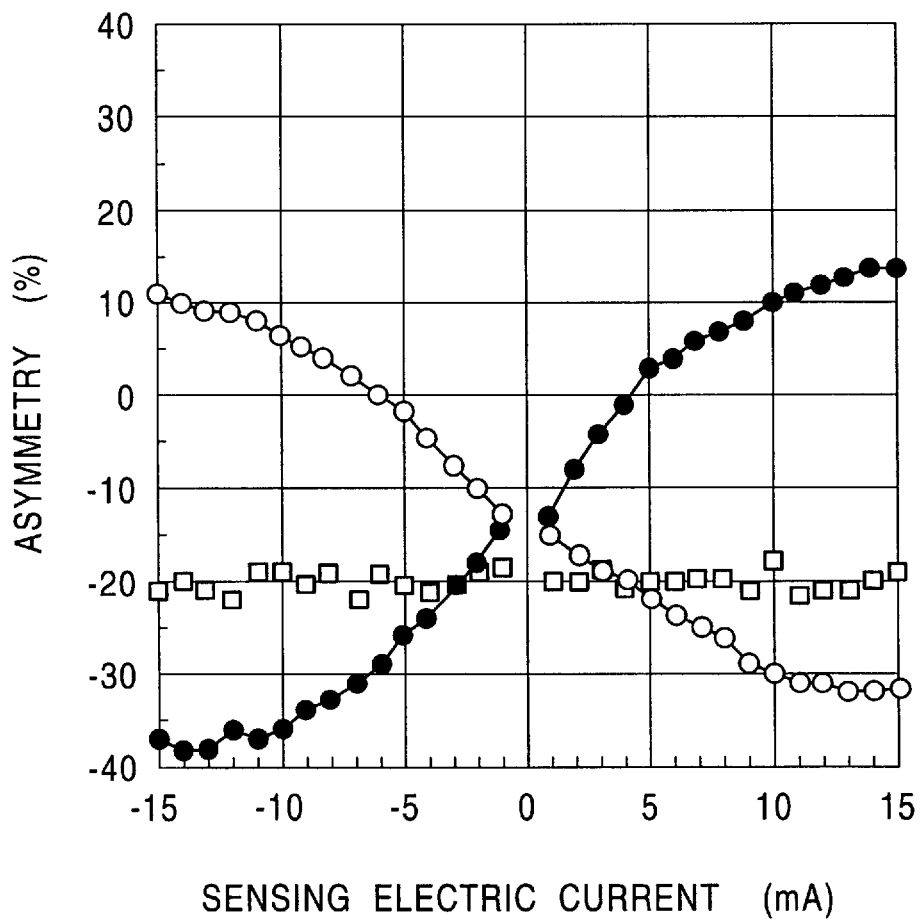
FIG. 8 is a graph which shows the relationship between the sensing electric current and asymmetry with respect to a vertically asymmetrical dual spin-valve type magnetoresistive thin film element (example), in which the distances GL1 and GL2 are set at different values.
Figure 9:
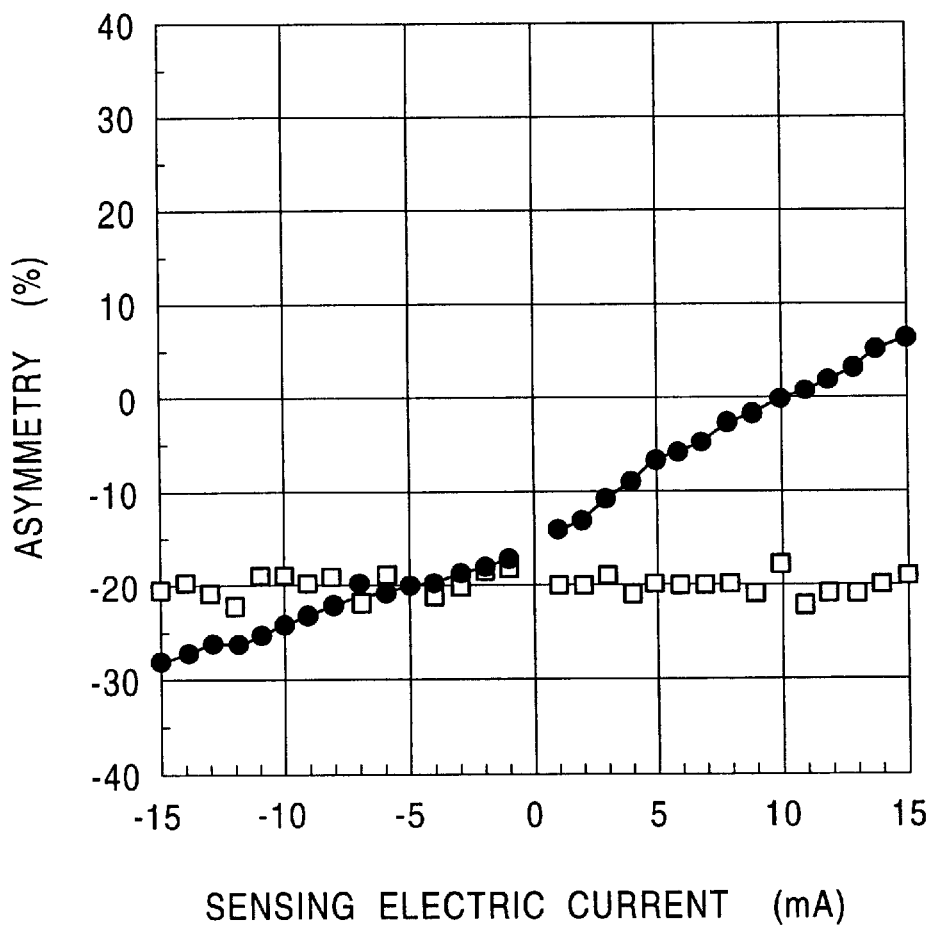
FIG. 9 is a graph which shows the relationship between the sensing electric current and asymmetry with respect to a vertically asymmetrical dual spin-valve type magnetoresistive thin film element, in which the distances GL1 and GL2 are set at the same value.
Figure 11:
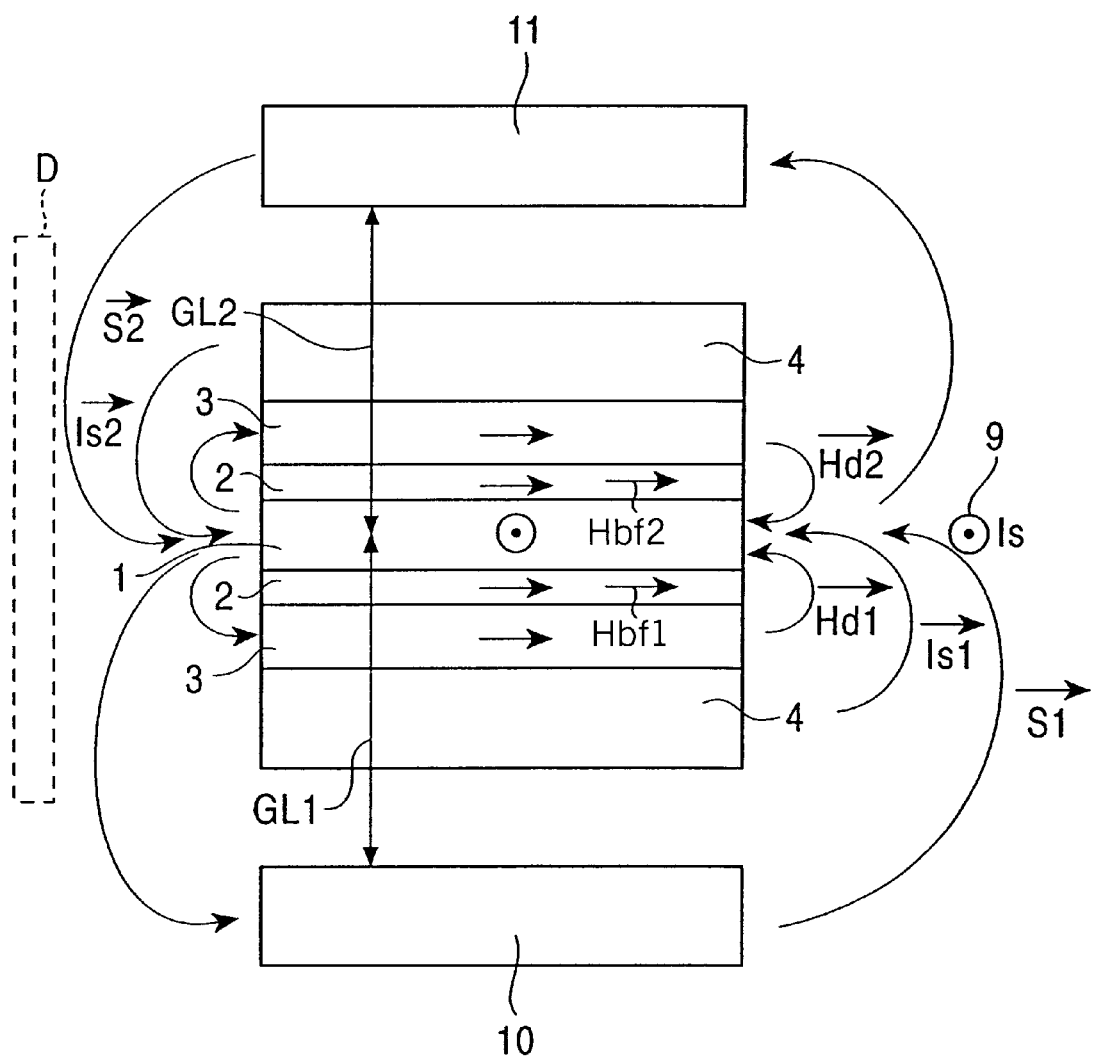
FIG. 11 is a longitudinal sectional view which schematically shows a spin-valve type magnetoresistive thin film head using the spin-valve type magnetoresistive thin film element shown in FIG. 10.

It has been confirmed by experiment that the static magnetic fields Hd1 and Hd2 depend on the thickness of the pinned magnetic layers 23 and 24 (refer to FIG. 6). As shown in FIG. 6, if the pinned magnetic layers 23 and 24 have the same thickness, the static magnetic coupling fields Hd1 and Hd2 have the same intensity.

From the lead layers 35 and 35 (refer to FIG. 1), a sensing electric current 36 (refer to FIG. 2) flows in the direction perpendicular to the magnetization of the pinned magnetic layers 23 and 24, for example, as shown in FIG. 2, perpendicularly with respect to the drawing toward the front. The sensing electric current 36 mainly flows through the nonmagnetic electrically-conductive layers 23 and 24 having low resistivity.

When the sensing electric current 36 is applied, induction magnetic fields Is1 and Is2 by the sensing electric current is generated in accordance with the corkscrew rule. When the sensing electric current 36 flows perpendicularly with respect to the drawing toward the front in FIG. 2, the induction magnetic field Is1 generated on the lower side of the free magnetic layer 20 is applied to the free magnetic layer 20 in the right direction in the drawing, and the induction magnetic field Is2 generated on the upper side of the free magnetic layer 20 is applied to the free magnetic layer in the left direction in the drawing. A lower shield layer 30 is formed on the lower side of the spin-valve type magnetoresistive thin film element 20 at a distance GL1 from the center of the free magnetic layer 20, and an upper shield layer 31 is formed on the upper side at a distance GL2 from the center of the free magnetic layer 20. Under the influence of the induction magnetic fields by the sensing electric current, a shield bias magnetic layer S1 is applied to the free magnetic layer 20 from the lower shield layer 30, and a shield bias magnetic layer S2 is applied to the free magnetic layer 20 from the upper shield layer 31.

Herein, when magnetic fields applied to the free magnetic layer 20 in the right direction in the drawing are assumed to have the positive values, and magnetic fields applied to the free magnetic layer 20 in the left direction in the drawing are assumed to have negative values, in FIG. 2, the interlayer coupling magnetic fields Hbf1 and Hbf2, the induction magnetic field Is2, and the shield bias magnetic field S2 are positive values, and the static magnetic coupling fields Hd1 and Hd2, the induction magnetic field Is1, and the shield bias magnetic field S1 are negative values.

If the sum of all the magnetic field values applied to the free magnetic layer 20 is zero, asymmetry will be 0%. In the present invention, by fabricating a spin-valve type magnetoresistive thin film element in a vertically asymmetrical structure, the above is enabled.

In more detail, by constructing the vertically asymmetrical structure, the intensity of the induction magnetic field Is1 is different from that of the induction magnetic field Is2, and by increasing the amount of the sensing electric current, the difference between the induction magnetic fields Is1 and Is2 can be increased, and the induction magnetic field caused by the vector sum of the induction magnetic fields Is1 and Is2 can be applied to the free magnetic layer 20.

For example, in the spin-valve type magnetoresistive thin film element shown in FIG. 2, when the distance GL1 is equal to the distance GL2, the shield bias magnetic fields S1 and S2 have the same intensity, and the shield bias magnetic fields S1 and S2 flow into the free magnetic layer 20 in opposite directions, and thus the magnetic fields S1 and S2 are offset with respect to each other. That is, in order to adjust asymmetry to 0%, the vector sum of interlayer coupling magnetic fields Hbf1 and Hbf2, static magnetic coupling fields Hd1 and Hd2, and induction magnetic fields Is1 and Is2 must be zero. When the vector sum of interlayer coupling magnetic fields Hbf1 and Hbf2 and static magnetic coupling fields Hd1 and Hd2 is not zero, and for example, if the vector sum has a component in the left direction in the drawing (negative value) with respect to the free magnetic layer 20, it is possible to adjust asymmetry to 0% by applying a magnetic field to the free magnetic layer 20 in the right direction in the drawing (positive value).

In the spin-valve type magnetoresistive thin film element shown in FIG. 2, since the thickness of the upper nonmagnetic electrically-conductive layer 22 is larger than that of the lower nonmagnetic electrically-conductive layer 21, and the sensing electric current 36 flows perpendicularly with respect to the drawing toward the front, the intensity of the induction magnetic field Is2 is higher than that of the induction magnetic field Is1, and an induction magnetic field (the induction magnetic field Is1+the induction magnetic field Is2) can be applied to the free magnetic layer 20 in the right direction in the drawing. If the amount of the sensing electric current is increased, the difference between the induction magnetic fields Is1 and Is2 is increased, and at a certain amount of the sensing electric current, the induction magnetic field (the induction magnetic field Is1+the induction magnetic field Is2) can be equalized with the vector sum of interlayer coupling magnetic fields Hbf1 and Hbf2 and static magnetic coupling fields Hd1 and Hd2, and thus asymmetry can be adjusted to 0%.

In the spin-valve type magnetoresistive thin film element shown in FIG. 2, although the vertical asymmetrical structure is obtained by creating a difference in thickness between the nonmagnetic electrically-conductive layers 21 and 22, another pair of identical layers sandwiching the free magnetic layer or two pairs of identical layers or more, excluding the nonmagnetic electrically-conductive layers 21 and 22, may be formed at different thickness to construct the vertically asymmetrical structure so that asymmetry is adjusted to 0% using the induction magnetic field.

As described above, in the present invention, by fabricating a dual spin-valve type magnetoresistive thin film element in a vertically symmetrical structure and by forming the individual layers constituting the dual spin-valve type magnetoresistive thin film element at the proper thickness, a rate of resistance variation which is at least larger than that (approximately 4%) in a single spin-valve type magnetoresistive thin film element can be obtained, and at the same time, by properly adjusting the direction and intensity of the sensing current, asymmetry can be adjusted to 0%.

In the dual spin-valve type magnetoresistive thin film head provided with the dual spin-valve type magnetoresistive thin film element and a pair of shield layers shown in FIG. 2, although the distance GL1 from the center of the free magnetic layer 20 to the lower shield layer 30 is the same as the distance GL2 from the center of the free magnetic layer 20 to the upper shield layer 31, by setting the distances GL1 and GL2 at different values, a shield bias magnetic field can be applied to the free magnetic layer 20.

For example, when the distances GL1 and GL2 are set at different values, the intensity of the shield bias magnetic field S1 applied to the free magnetic layer 20 from the lower shield layer 30 is different from that of the shield bias magnetic field S2 applied to the free magnetic layer 20 from the upper shield layer 31, a shield bias magnetic field determined by the vector sum of the shield bias magnetic fields S1 and S2 can be used to adjust asymmetry to 0%. For example, if the distance GL1 is less than the distance GL2, the intensity of the shield bias magnetic field S1 is higher than that of the shield bias magnetic field S2, and a shield bias magnetic field (shield bias magnetic field S1+shield bias magnetic field S2) can be applied to the free magnetic layer 20 in the left direction in the drawing. If the distance GL2 is shorter than the distance GL1, the intensity of the shield bias magnetic field S2 is higher than that of the shield bias magnetic field S1, and a shield bias magnetic field (shield bias magnetic field S1+shield bias magnetic field S2) can be applied to the free magnetic layer 20 in the right direction in the drawing.

That is, by setting the distances GL1 and GL2 at different values, not only the induction magnetic field by the sensing electric current, but also the shield bias magnetic field, can be used for adjusting asymmetry to 0%. In particular, the greatest merit of being able to use the shield bias magnetic field is that asymmetry can be adjusted to 0% with a smaller amount of sensing electric current in comparison with the amount of sensing electric current required when asymmetry is adjusted to 0% only by the induction magnetic field by the sensing electric current.

For example, suppose that asymmetry can be adjusted to 0% by applying the sensing electric current 36, shown in FIG. 2, in the amount of 10 mA in the direction perpendicular with respect to the drawing toward the front to generate a given amount of an induction magnetic field (induction magnetic field Is1+induction magnetic field Is2). In such a case, when the distance GL2 is made shorter than the distance GL1, the intensity of the shield bias magnetic field S2 is higher than that of the shield bias magnetic field S1, and a shield bias magnetic field (shield bias magnetic field S1+shield bias magnetic field S2) is applied to the free magnetic layer 20 in the right direction in the drawing, the same as in the induction magnetic field described above. Therefore, even if the sensing electric current is decreased to less than 10 mA and the intensity of the induction magnetic field influencing in the right direction in the drawing is reduced, the reduced intensity of the magnetic field can be compensated for by the influence of the shield bias magnetic field in the right direction in the drawing, enabling the adjustment of asymmetry to 0%. If the amount of the sensing electric current can be decreased in such a manner, the heat value or the like may be suppressed.

In a vertically symmetrical spin-valve type magnetoresistive thin film element, such as in a conventional one, although it is not possible to use an induction magnetic field by the sensing electric current in order to adjust asymmetry to 0%, instead of the induction magnetic field by the sensing electric current, by using a shield bias magnetic field, asymmetry can be adjusted to 0%.

In accordance with the present invention, as described above in detail, asymmetry can be adjusted to 0% by constructing a vertical asymmetrical structure, in which a pair of identical layers sandwiching a free magnetic layer or two pairs or more of identical layers are formed at different thickness, and by properly adjusting the intensity and direction of a sensing electric current.

In particular, in accordance with the present invention, the individual layers constituting a spin-valve type magnetoresistive thin film element may be formed at any thickness so as to increase the rate of resistance variation, and in such a case, if laminates sandwiching a free magnetic layer are asymmetrical, by properly adjusting the intensity and the direction of a sensing electric current as described above, asymmetry can be adjusted to 0%.

If the spin-valve type magnetoresistive thin film element is vertically symmetrical, by creating a difference between the distance from the center of the free magnetic layer to a lower shield layer formed on the lower side of the thin film element and the distance from the center of the free magnetic layer to an upper shield layer formed on the upper side of the thin film element, use of a shield bias magnetic field is enabled, and by properly adjusting the intensity and direction of the sensing electric current, asymmetry can be adjusted to 0%.

What is claimed is:

1. A spin-valve type magnetoresistive thin film head comprising a spin-valve type magnetoresistive thin film element comprising:

a free magnetic layer;

an upper nonmagnetic electrically-conductive layer and a lower nonmagnetic electrically-conductive layer sandwiching the free magnetic layer;

an upper pinned magnetic layer formed on the upper electrically-conductive layer and a lower pinned magnetic layer formed on the lower nonmagnetic electrically-conductive layer, the magnetization directions of the upper and lower pinned magnetic layers being fixed; and an upper antiferromagnetic layer formed on the upper pinned magnetic layer and a lower antiferromagnetic layer formed on the lower pinned magnetic layer;

a sensing electric current being applied in the direction perpendicular to the fixed magnetization of the pinned magnetic layers, and electrical resistance changing in response to the relationship between the fixed magnetization of the pinned magnetic layers and the variable magnetization of the free magnetic layer;

wherein the sum of the amplitudes of the vectors Hbf1+Hbf2+Hd1+Hd2+Is1+Is2+S1+S2 is zero, where Hbf1 is the intensity (vector) of the magnetic field caused by interlayer coupling between the lower pinned magnetic layer and the lower nonmagnetic electrically-conductive layer, Hbf2 is the intensity (vector) of the magnetic field caused by interlayer coupling between the upper pinned magnetic layer and the upper nonmagnetic electrically-conductive layer, Hd1 is the intensity (vector) of the static magnetic coupling field applied from the lower pinned magnetic layer to the free magnetic layer, Hd2 is the intensity (vector) of the static magnetic coupling field applied from the upper pinned magnetic layer to the free magnetic layer, Is1 is the intensity (vector) of the induction magnetic field by an electric current applied to the free magnetic layer from the lower side, Is2 is the intensity (vector) of the induction magnetic field by an electric current applied to the free magnetic layer from the upper side, S1 is the intensity (vector) of the shield bias magnetic field applied to the free magnetic layer from a lower shield layer formed on the lower side of the spin-valve type magnetoresistive thin film element with a gap layer therebetween, and S2 is the intensity (vector) of the shield bias magnetic field applied to the free magnetic layer from an upper shield layer formed on the upper side of the spin-valve type magnetoresistive thin film element with a gap layer therebetween.

2. A spin-valve type magnetoresistive thin film head according to claim 1, wherein the vector sum of Hbf1+Hbf2+Hd1+Hd2+Is1+Is2+S1+S2 is adjusted to zero by creating a difference in thickness between the upper and lower nonmagnetic electrically-conductive layers and by changing the sensing electric current and the direction of the sensing electric current.

3. A spin-valve type magnetoresistive thin film head according to claim 1, wherein the lower nonmagnetic electrically-conductive layer has a thickness of 16 to 38 angstroms and the upper nonmagnetic electrically-conductive layer has a thickness of 19 to 38 angstroms.

4. A spin-valve type magnetoresistive thin film head according to claim 1, wherein the vector sum of Hbf1+Hbf2+Hd1+Hd2+Is1+Is2+S1+S2 is adjusted to zero by creating a difference in thickness between the upper and lower pinned magnetic layers and by changing the sensing electric current and the direction of the sensing electric current.

5. A spin-valve type magnetoresistive thin film head according to claim 1, wherein the upper and lower pinned magnetic layers have a thickness of 15 to 80 angstroms.

6. A spin-valve type magnetoresistive thin film head according to claim 1, wherein the vector sum of Hbf1+Hbf2+Hd1+Hd2+Is1+Is2+S1+S2 is adjusted to zero by creating a difference in thickness between the upper and lower antiferromagnetic layers and by changing the sensing electric current and the direction of the sensing electric current.

7. A spin-valve type magnetoresistive thin film head according to claim 1, further comprising a metallic under layer formed under the lower antiferromagnetic layer and a metallic protective layer formed on the upper antiferromagnetic layer,
wherein the vector sum of Hbf1+Hbf2+Hd1+Hd2+Is1+Is2+S1+S2 is adjusted to zero by creating a difference in thickness between the metallic under layer and the metallic protective layer and by changing the sensing electric current and the direction of the sensing electric current.

8. A spin-valve type magnetoresistive thin film head according to claim 1, wherein the vector sum of Hbf1+Hbf2+Hd1+Hd2+Is1+Is2+S1+S2 is adjusted to zero by creating a difference in distance between from the center of the free magnetic layer to the lower shield layer, and from the center of the free magnetic layer to the upper shield layer, and by changing the sensing electric current and the direction of the sensing electric current.

9. A spin-valve type magnetoresistive thin film head according to claim 2, wherein the lower nonmagnetic electrically-conductive layer has a thickness of 16 to 38 angstroms and the upper nonmagnetic electrically-conductive layer has a thickness of 19 to 38 angstroms.

10. A spin-valve type magnetoresistive thin film head according to claim 2, wherein the vector sum of Hbf1+Hbf2+Hd1+Hd2+Is1+Is2+S1+S2 is adjusted to zero by creating a difference in thickness between the upper and lower pinned magnetic layers and by changing the sensing electric current and the direction of the sensing electric current.

11. A spin-valve type magnetoresistive thin film head according to claim 2, wherein the upper and lower pinned magnetic layers have a thickness of 15 to 80 angstroms.

12. A spin-valve type magnetoresistive thin film head according to claim 2, wherein the vector sum of Hbf1+Hbf2+Hd1+Hd2+Is1+Is2+S1+S2 is adjusted to zero by creating a difference in thickness between the upper and lower antiferromagnetic layers and by changing the sensing electric current and the direction of the sensing electric current.

13. A spin-valve type magnetoresistive thin film head according to claim 2, further comprising a metallic under layer formed under the lower antiferromagnetic layer and a metallic protective layer formed on the upper antiferromagnetic layer,
wherein the vector sum of Hbf1+Hbf2+Hd1+Hd2+Is1+Is2+S1+S2 is adjusted to zero by creating a difference in thickness between the metallic under layer and the metallic protective layer and by changing the sensing electric current and the direction of the sensing electric current.

14. A spin-valve type magnetoresistive thin film head according to claim 2, wherein the vector sum of Hbf1+Hbf2+Hd1+Hd2+Is1+Is2+S1+S2 is adjusted to zero by creating a difference in distance between from the center of the free magnetic layer to the lower shield layer, and from the center of the free magnetic layer to the upper shield layer, and by changing the sensing electric current and the direction of the sensing electric current.

15. A spin-valve type magnetoresistive thin film head according to claim 3, wherein the vector sum of Hbf1+Hbf2+Hd1+Hd2+Is1+Is2+S1+S2 is adjusted to zero by creating a difference in thickness between the upper and lower pinned magnetic layers and by changing the sensing electric current and the direction of the sensing electric current.

16. A spin-valve type magnetoresistive thin film head according to claim 3, wherein the upper and lower pinned magnetic layers have a thickness of 15 to 80 angstroms.

17. A spin-valve type magnetoresistive thin film head according to claim 3, wherein the vector sum of Hbf1+Hbf2+Hd1+Hd2+Is1+Is2+S1+S2 is adjusted to zero by creating a difference in thickness between the upper and lower antiferromagnetic layers and by changing the sensing electric current and the direction of the sensing electric current.

18. A spin-valve type magnetoresistive thin film head according to claim 3, further comprising a metallic under layer formed under the lower antiferromagnetic layer and a metallic protective layer formed on the upper antiferromagnetic layer,
wherein the vector sum of Hbf1+Hbf2+Hd1+Hd2+Is1+Is2+S1+S2 is adjusted to zero by creating a difference in thickness between the metallic under layer and the metallic protective layer and by changing the sensing electric current and the direction of the sensing electric current.

19. A spin-valve type magnetoresistive thin film head according to claim 3, wherein the vector sum of Hbf1+Hbf2+Hd1+Hd2+Is1+Is2+S1+S2 is adjusted to zero by creating a difference in distance between from the center of the free magnetic layer to the lower shield layer, and from the center of the free magnetic layer to the upper shield layer, and by changing the sensing electric current and the direction of the sensing electric current.

20. A spin-valve type magnetoresistive thin film head according to claim 4, wherein the upper and lower pinned magnetic layers have a thickness of 15 to 80 angstroms.

21. A spin-valve type magnetoresistive thin film head according to claim 4, wherein the vector sum of Hbf1+Hbf2+Hd1+Hd2+Is1+Is2+S1+S2 is adjusted to zero by creating a difference in thickness between the upper and lower antiferromagnetic layers and by changing the sensing electric current and the direction of the sensing electric current.

22. A spin-valve type magnetoresistive thin film head according to claim 4, further comprising a metallic under layer formed under the lower antiferromagnetic layer and a metallic protective layer formed on the upper antiferromagnetic layer,
wherein the vector sum of Hbf1+Hbf2+Hd1+Hd2+Is1+Is2+S1+S2 is adjusted to zero by creating a difference in thickness between the metallic under layer and the metallic protective layer and by changing the sensing electric current and the direction of the sensing electric current.

23. A spin-valve type magnetoresistive thin film head according to claim 4, wherein the vector sum of Hbf1+Hbf2+Hd1+Hd2+Is1+Is2+S1+S2 is adjusted to zero by creating a difference in distance between from the center of the free magnetic layer to the lower shield layer, and from the center of the free magnetic layer to the upper shield layer, and by changing the sensing electric current and the direction of the sensing electric current.

24. A spin-valve type magnetoresistive thin film head according to claim 5, wherein the vector sum of Hbf1+Hbf2+Hd1+Hd2+Is1+Is2+S1+S2 is adjusted to zero by creating a difference in thickness between the upper and lower antiferromagnetic layers and by changing the sensing electric current and the direction of the sensing electric current.

25. A spin-valve type magnetoresistive thin film head according to claim 5, further comprising a metallic under layer formed under the lower antiferromagnetic layer and a metallic protective layer formed on the upper antiferromagnetic layer,
wherein the vector sum of Hbf1+Hbf2+Hd1+Hd2+Is1+Is2+S1+S2 is adjusted to zero by creating a difference in thickness between the metallic under layer and the metallic protective layer and by changing the sensing electric current and the direction of the sensing electric current.

26. A spin-valve type magnetoresistive thin film head according to claim 5, wherein the vector sum of Hbf1+Hbf2+Hd1+Hd2+Is1+Is2+S1+S2 is adjusted to zero by creating a difference in distance between from the center of the free magnetic layer to the lower shield layer, and from the center of the free magnetic layer to the upper shield layer, and by changing the sensing electric current and the direction of the sensing electric current.

27. A spin-valve type magnetoresistive thin film head according to claim 6, further comprising a metallic under layer formed under the lower antiferromagnetic layer and a metallic protective layer formed on the upper antiferromagnetic layer, wherein the vector sum of Hbf1+Hbf2+Hd1+Hd2+Is1+Is2+S1+S2 is adjusted to zero by creating a difference in thickness between the metallic under layer and the metallic protective layer and by changing the sensing electric current and the direction of the sensing electric current.

28. A spin-valve type magnetoresistive thin film head according to claim 6, wherein the vector sum of Hbf1+Hbf2+Hd1+Hd2+Is1+Is2+S1+S2 is adjusted to zero by creating a difference in distance between from the center of the free magnetic layer to the lower shield layer, and from the center of the free magnetic layer to the upper shield layer, and by changing the sensing electric current and the direction of the sensing electric current.

29. A spin-valve type magnetoresistive thin film head according to claim 7, wherein the vector sum of Hbf1+Hbf2+Hd1+Hd2+Is1+Is2+S1+S2 is adjusted to zero by creating a difference in distance between from the center of the free magnetic layer to the lower shield layer, and from the center of the free magnetic layer to the upper shield layer, and by changing the sensing electric current and the direction of the sensing electric current.

30. A spin-valve type magnetoresistive thin film head according to claim 10, wherein the upper and lower pinned magnetic layers have a thickness of 15 to 80 angstroms.

31. A spin-valve type magnetoresistive thin film head according to claim 10, wherein the vector sum of Hbf1+Hbf2+Hd1+Hd2+Is1+Is2+S1+S2 is adjusted to zero by creating a difference in thickness between the upper and lower antiferromagnetic layers and by changing the sensing electric current and the direction of the sensing electric current.

32. A spin-valve type magnetoresistive thin film head according to claim 16, wherein the vector sum of Hbf1+Hbf2+Hd1+Hd2+Is1+Is2+S1+S2 is adjusted to zero by creating a difference in thickness between the upper and lower antiferromagnetic layers and by changing the sensing electric current and the direction of the sensing electric current.

33. A spin-valve type magnetoresistive thin film head according to claim 21, further comprising a metallic under layer formed under the lower antiferromagnetic layer and a metallic protective layer formed on the upper antiferromagnetic layer,
wherein the vector sum of Hbf1+Hbf2+Hd1+Hd2+Is1+Is2+S1+S2 is adjusted to zero by creating a difference in thickness between the metallic under layer and the metallic protective layer and by changing the sensing electric current and the direction of the sensing electric current.

34. A spin-valve type magnetoresistive thin film head according to claim 24, further comprising a metallic under layer formed under the lower antiferromagnetic layer and a metallic protective layer formed on the upper antiferromagnetic layer,
wherein the vector sum of Hbf1+Hbf2+Hd1+Hd2+Is1+Is2+S1+S2 is adjusted to zero by creating a difference in thickness between the metallic under layer and the metallic protective layer and by changing the sensing electric current and the direction of the sensing electric current.

35. A spin-valve type magnetoresistive thin film head according to claim 27, wherein the vector sum of Hbf1+Hbf2+Hd1+Hd2+Is1+Is2+S1+S2 is adjusted to zero by creating a difference in distance between from the center of the free magnetic layer to the lower shield layer, and from the center of the free magnetic layer to the upper shield layer, and by changing the sensing electric current and the direction of the sensing electric current.

36. A spin-valve type magnetoresistive thin film head according to claim 31, further comprising a metallic under layer formed under the lower antiferromagnetic layer and a metallic protective layer formed on the upper antiferromagnetic layer,
wherein the vector sum of Hbf1+Hbf2+Hd1+Hd2+Is1+Is2+S1+S2 is adjusted to zero by creating a difference in thickness between the metallic under layer and the metallic protective layer and by changing the sensing electric current and the direction of the sensing electric current.

37. A spin-valve type magnetoresistive thin film head according to claim 32, further comprising a metallic under layer formed under the lower antiferromagnetic layer and a metallic protective layer formed on the upper antiferromagnetic layer,
wherein the vector sum of Hbf1+Hbf2+Hd1+Hd2+Is1+Is2+S1+S2 is adjusted to zero by creating a difference in thickness between the metallic under layer and the metallic protective layer and by changing the sensing electric current and the direction of the sensing electric current.

38. A spin-valve type magnetoresistive thin film head according to claim 33, wherein the vector sum of Hbf1+Hbf2+Hd1+Hd2+Is1+Is2+S1+S2 is adjusted to zero by creating a difference in distance between from the center of the free magnetic layer to the lower shield layer, and from the center of the free magnetic layer to the upper shield layer, and by changing the sensing electric current and the direction of the sensing electric current.

39. A spin-valve type magnetoresistive thin film head according to claim 34, wherein the vector sum of Hbf1+Hbf2+Hd1+Hd2+Is1+Is2+S1+S2 is adjusted to zero by creating a difference in distance between from the center of the free magnetic layer to the lower shield layer, and from the center of the free magnetic layer to the upper shield layer, and by changing the sensing electric current and the direction of the sensing electric current.

40. A spin-valve type magnetoresistive thin film head according to claim 36, wherein the vector sum of Hbf1+Hbf2+Hd1+Hd2+Is1+Is2+S1+S2 is adjusted to zero by creating a difference in distance between from the center of the free magnetic layer to the lower shield layer, and from the center of the free magnetic layer to the upper shield layer, and by changing the sensing electric current and the direction of the sensing electric current.

41. A spin-valve type magnetoresistive thin film head according to claim 37, wherein the vector sum of Hbf1+Hbf2+Hd1+Hd2+Is1+Is2+S1+S2 is adjusted to zero by creating a difference in distance between from the center of the free magnetic layer to the lower shield layer, and from the center of the free magnetic layer to the upper shield layer, and by changing the sensing electric current and the direction of the sensing electric current.

* * * * *